(12) United States Patent
Nagar

(10) Patent No.: US 11,953,150 B2
(45) Date of Patent: Apr. 9, 2024

(54) BELT TRAP APPARATUSES

(71) Applicant: DEERE & COMPANY, Moline, IL (US)

(72) Inventor: Dharmendra Nagar, Pune (IN)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/155,316

(22) Filed: Jan. 17, 2023

(65) Prior Publication Data

US 2024/0035617 A1 Feb. 1, 2024

Related U.S. Application Data

(60) Provisional application No. 63/369,837, filed on Jul. 29, 2022.

(51) Int. Cl.
*F16P 1/02* (2006.01)
*F16H 7/02* (2006.01)
*F16H 57/00* (2012.01)

(52) U.S. Cl.
CPC ............. *F16P 1/02* (2013.01); *F16H 57/00* (2013.01); *F16H 7/02* (2013.01)

(58) Field of Classification Search
CPC ................ F16H 7/18; F16H 7/02; F16H 7/24
USPC ........................................................ 474/144
See application file for complete search history.

(56) References Cited

U.S. PATENT DOCUMENTS

| 582,096 | A | * | 5/1897 | Rominger | B62J 13/02 |
| | | | | | 474/144 |
| 1,717,431 | A | * | 6/1929 | Blanchard | B23Q 5/14 |
| | | | | | 474/144 |
| 2,862,569 | A | * | 12/1958 | Strunk | B60K 17/08 |
| | | | | | 474/144 |
| 3,885,471 | A | * | 5/1975 | Morine | F16P 1/02 |
| | | | | | 474/144 |
| 5,067,930 | A | * | 11/1991 | Morales | B62J 13/00 |
| | | | | | 474/144 |
| 5,580,325 | A | * | 12/1996 | Hirota | F02B 77/081 |
| | | | | | 474/144 |
| 6,238,312 | B1 | * | 5/2001 | Tsubata | F16H 57/0489 |
| | | | | | 474/146 |
| 7,690,407 | B2 | * | 4/2010 | Annala | A01G 23/091 |
| | | | | | 144/4.1 |
| 7,704,174 | B2 | * | 4/2010 | Takada | F01M 9/06 |
| | | | | | 440/88 L |
| 7,771,303 | B2 | * | 8/2010 | Fuse | F16H 7/18 |
| | | | | | 474/140 |
| 11,408,499 | B2 | * | 8/2022 | Blomdahl | F16H 57/0453 |
| 2002/0042316 | A1 | * | 4/2002 | Young, Jr. | B62J 13/00 |
| | | | | | 474/140 |

(Continued)

FOREIGN PATENT DOCUMENTS

CN 203359461 U 12/2013
CN 203359463 U 12/2013

(Continued)

*Primary Examiner* — Henry Y Liu

(57) ABSTRACT

Belt traps for belt drive systems function to arrest a failed drive belt or otherwise absorb energy of the failed drive belt to avoid or reduce damage to components of the belt drive system or objects adjacent to the belt drive system. Belt traps may include a channel configured to receive a portion of a drive belt and one or more protrusions to pierce, grip, or otherwise engage the failed drive belt.

19 Claims, 14 Drawing Sheets

(56) References Cited

U.S. PATENT DOCUMENTS

| | | | | |
|---|---|---|---|---|
| 2002/0160869 A1* | 10/2002 | Barnett | ................ | B62M 9/138 |
| | | | | 474/144 |
| 2011/0251003 A1* | 10/2011 | Nishimiya | ................ | F16H 7/02 |
| | | | | 474/144 |
| 2015/0043942 A1* | 2/2015 | Okuno | ................ | G03G 15/757 |
| | | | | 399/167 |
| 2015/0259030 A1* | 9/2015 | Nakano | ................ | F16H 7/18 |
| | | | | 474/144 |
| 2019/0136961 A1* | 5/2019 | Blomdahl | ............ | F16H 57/0453 |

FOREIGN PATENT DOCUMENTS

| | | |
|---|---|---|
| CN | 203667492 U | 6/2014 |
| CN | 104495293 A | 4/2015 |

* cited by examiner

FIG. 2
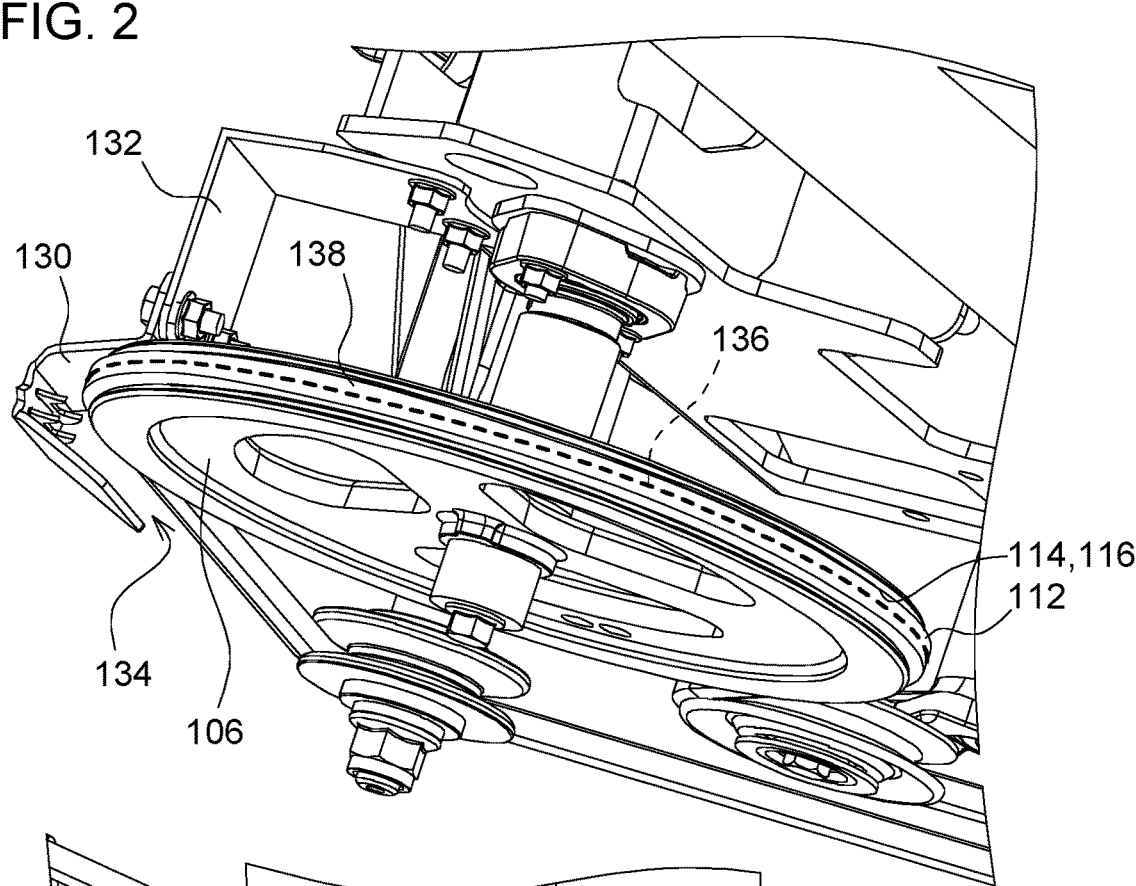
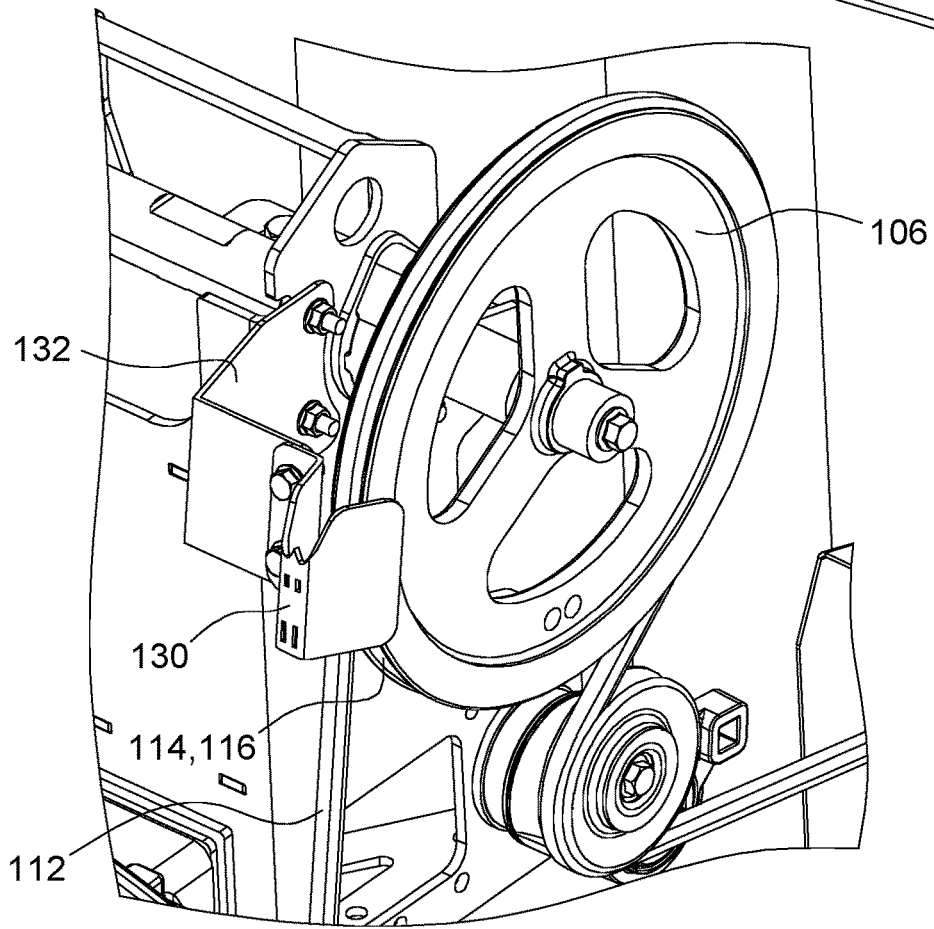
FIG. 3

BELT TRAP APPARATUSES

CROSS REFERENCE TO RELATED APPLICATIONS

This application claims the benefit of U.S. Provisional Application No. 63/369,837, filed Jul. 29, 2022, the entire contents of which are incorporated herein by reference.

FIELD OF THE DISCLOSURE

The present disclosure relates generally to belt drive systems and, particularly, to belt traps to arrest or otherwise absorb energy of a severed or broken drive belt during operation of the belt drive system.

BACKGROUND OF THE DISCLOSURE

Belt drive systems are used to transmit mechanical power between rotating shafts. In some instances, the belt drives control speed and torque transmitted to the rotating shafts.

SUMMARY OF THE DISCLOSURE

A first aspect of the present disclosure is directed to a belt trap mountable in a belt drive system adjacent to a portion of a drive belt of the belt drive system. The belt trap may include a first wall; a channel defined at least in part by the first wall; and a protrusion extending from the first wall, the protrusion extending into the channel.

A second aspect of the present disclosure is directed to a belt drive system. The belt drive system may include a belt trap mountable at a location along a belt drive system. The belt trap may include a first wall defining at least a portion of a channel sized and shaped to receive a belt of the belt drive system and a protrusion extending into the channel from the first wall.

The various aspects may include one or more of the following features. The channel may define a first end and a second end. The protrusion may include a plurality of protrusions, and the plurality of protrusions may be arranged along an edge of the first wall formed at the first end of the channel or the second end of the channel. The belt trap may include a second wall, opposite the first wall, and an end wall extending between the first wall and the second wall. The protrusion may extend from an interior surface of the end wall. The first wall and the second wall may be nonparallel. The protrusion may include a plurality of protrusions extending from the interior surface of the first wall. The protrusion may define a spiked portion. The protrusion may define a generally triangular shape. The protrusion may be transversely oriented relative to the channel. The protrusion may be longitudinally oriented relative to the channel. The first wall may include an edge that defines a peak.

The various aspects may include one or more of the following features. The belt drive system may also include a pulley and an endless belt movable along a circuitous route. The pulley may include a peripheral edge and a groove formed in the peripheral edge. The pulley may be rotatable in a first rotational direction about an axis. The endless belt may be received into at least a portion of the groove as the endless belt moves along the circuitous route. The belt trap may be positioned at a location along the circuitous route such that the endless belt is received into the channel. The belt trap may be located at a position adjacent the pulley along the circuitous route. The belt trap may also include a second wall, opposite the first wall and a third wall extending between the first wall and the second wall. The first wall and the second wall may be nonparallel. The protrusion may be configured to engage the endless belt upon release of the endless belt from the pulley. The first wall may define a first end and a second end; the protrusion may include a plurality of protrusion; and the plurality of protrusions may be arranged along an edge formed at the first end of the first wall or the second end of the first wall. The protrusion may define a peak. The protrusion may be transversely oriented relative to the channel. The protrusion may be longitudinally oriented relative to the channel. The belt trap may include a second wall, opposite the first wall; a third wall extending between the first wall and the second wall; and a mounting portion formed on one of the first wall or the second wall.

Other features and aspects will become apparent by consideration of the detailed description and accompanying drawings.

BRIEF DESCRIPTION OF THE DRAWINGS

The detailed description of the drawings refers to the accompanying figures in which:

FIG. 2 is a detail view of the belt drive system of FIG. 1.

FIG. 3 is another detail view of the belt drive system of FIG. 1.

DETAILED DESCRIPTION

Figure 1:
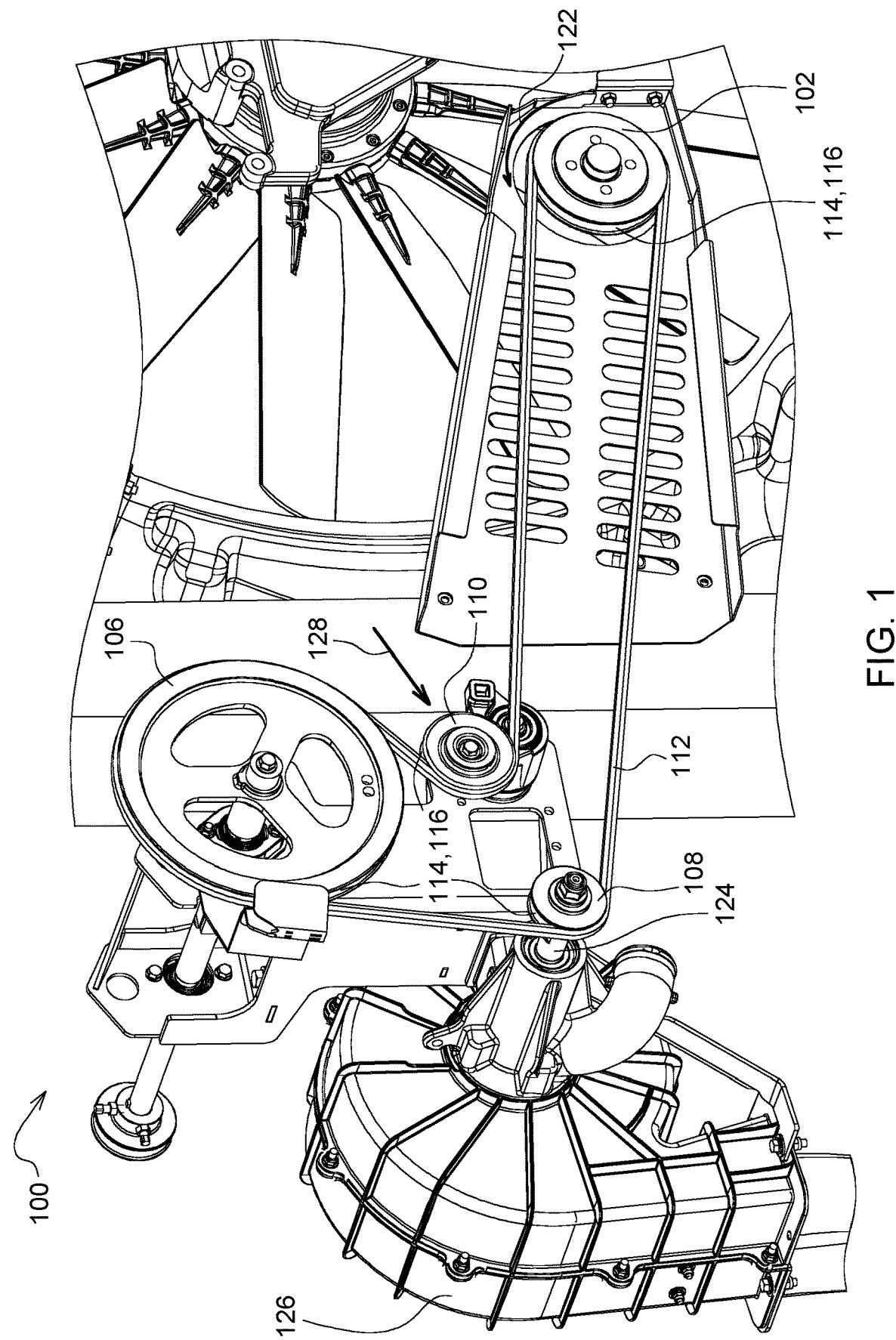
FIG. 1 is an oblique view of an example belt drive system, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, or methods and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to systems and apparatuses that reduce or eliminate damage associated with a broken belt in a belt drive system occurring during operation of the belt drive system. The present disclosure is applicable to many types of belt drive systems, particularly in the agricultural industry. However, the scope of the present disclosure is not limited to agricultural applications but, rather, can be used in any belt drive application.

Belt drive systems are used to transmit motion, for example, from a drive pulley to one or more driven pulleys. Belt drive systems may also be used to alter an operating speed of or a torque imparted to a driven pulley. Belt drive systems include an endless belt (interchangeably referred to as a "drive belt"). During the course of operation of a belt drive system, the drive belt may fail, such as in response to wear or damage, causing the belt to sever. Ends of the severed drive belt can depart from the path defined by the continuous drive belt and move chaotically, thrashing about in any number of directions. This chaotic movement can cause the severed drive belt to contact components of the drive belt system or other objects in the vicinity of the drive belt system, such as a motive device (e.g., an engine or motor) used to operate the drive pulley. As a result, a severed drive belt can cause damage to those objects into which the severed drive belt comes into contact.

The present disclosure describes belt traps located at one or more locations along a circuitous route defined by the continuous drive belt in a belt drive system, such as along a perimeter of a drive pulley. However, a belt trap can be positioned at any location along the circuitous route of a belt drive system. Inclusion of one or more belt traps, as described herein, may eliminate or reduce the risk of damage to the belt drive system or other object adjacent to the belt drive system by unconstrained motion of a severed drive belt during operation of the belt drive system.

FIG. 1 is a perspective view of an example belt drive system 100 included in a combine harvester. However, as explained earlier, the scope of the present disclosure is not limited to agricultural applications. The belt drive system 100 includes a drive pulley 102; driven pulleys 106 and 108; a tensioner pulley 110; and a drive belt 112 defining a circuitous route. The drive belt 112 is received into grooves 114 formed into peripheral edges 116 of each of the drive pulley 102, driven pulleys 106 and 108, and tensioner pulley 110. Rotation of the drive pulley 102 causes the drive belt 112 to move along the circuitous route, causing the driven pulleys 106 and 108 and tensioner pulley 110 to rotate in response. In this example, the drive pulley 102 is rotated in the direction of arrow 122. The driven pulley 108 is coupled to a shaft 124 of a fan 126, thereby causing the fan to operate. The tensioner pulley 110 is biased in the direction of arrow 128 and imparts a force to the drive belt 112 that increases a frictional force between the pulleys and the drive belt 112 as well as to generate tension in the drive belt 112.

The belt drive system 100 also includes a belt trap 130 located at a location along the drive belt 112 to arrest or otherwise absorb kinetic energy of the drive belt 112 when the drive belt 112 breaks during operation of the belt drive system 100. Although the drive belt system 100 is shown with a single belt trap 130, other belt traps 130 can be included at one or more other locations along the drive belt 112.

FIGS. 2 and 3 are detail view of the belt drive system 100 showing the belt trap 130 located adjacent to the peripheral edge 116 of the drive pulley 102. The belt trap 130 is mounted to a bracket 132 such that a channel 134 formed by the belt trap 130 receives a portion of the peripheral edge 116 of the driven pulley 106 and a portion of the drive belt 112.

Figure 4:
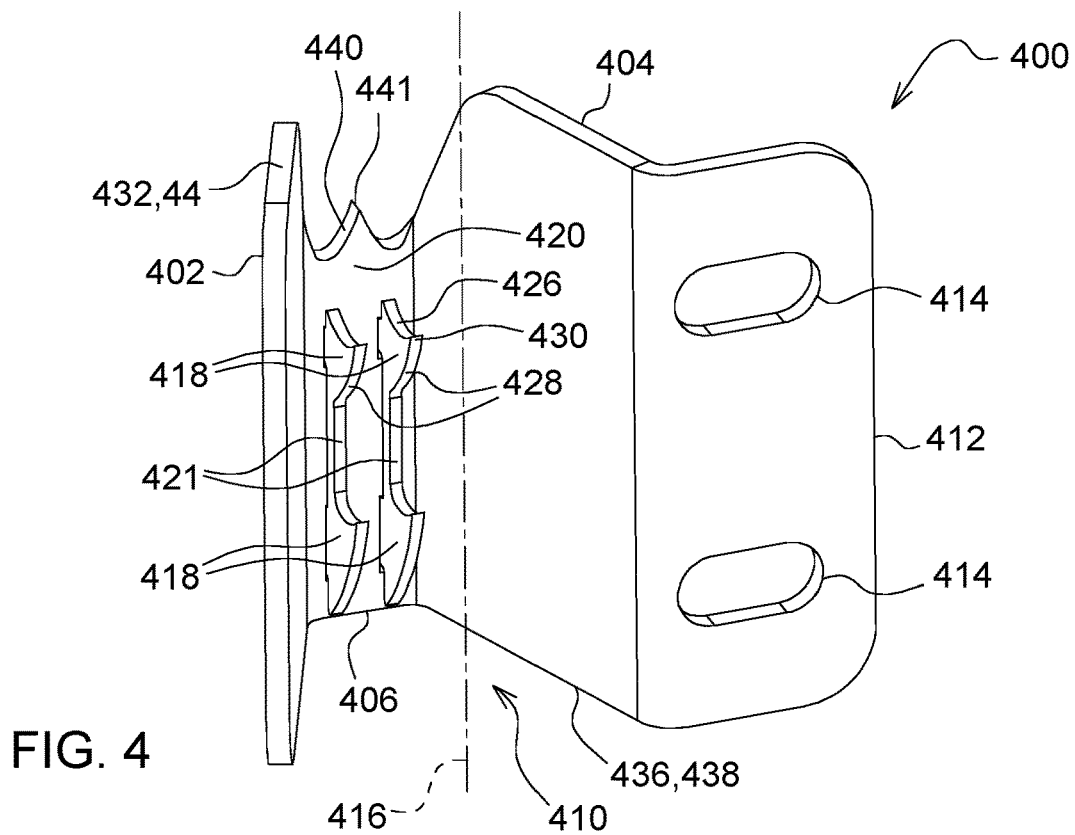
FIGS. 4 and 5 are oblique views of an example belt trap, according to some implementations of the present disclosure.
Figure 5:
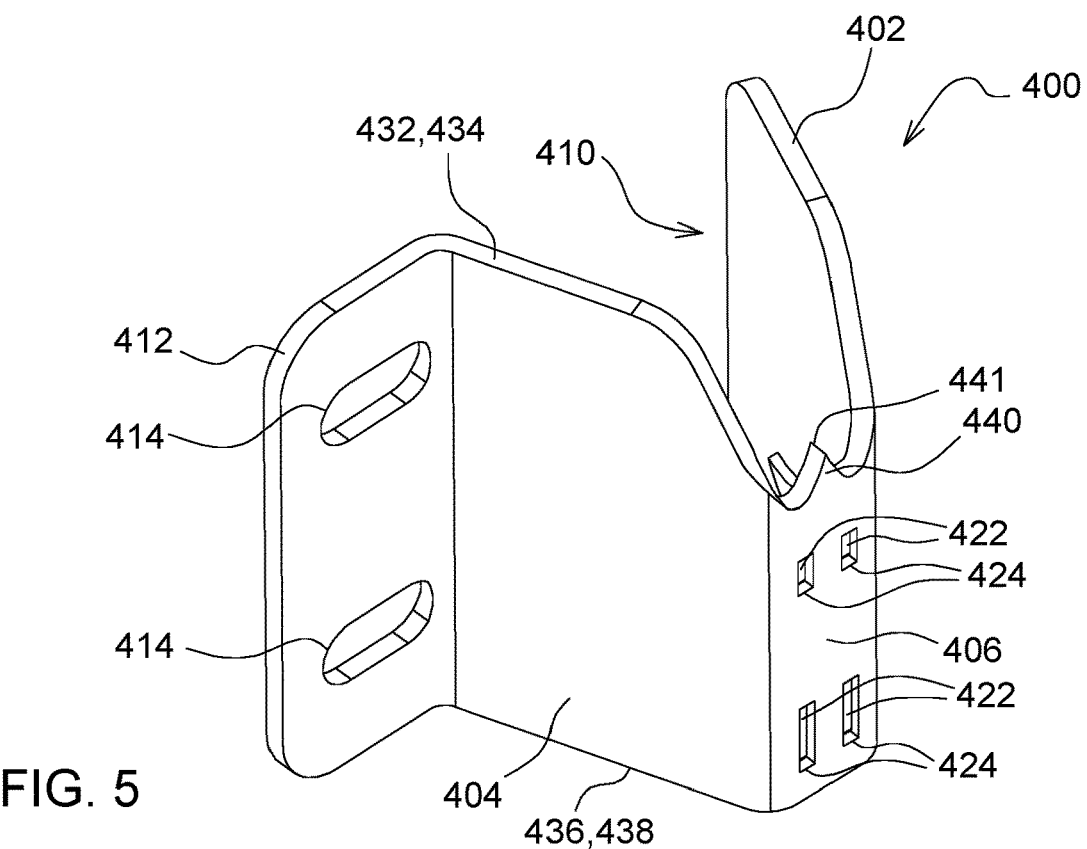

FIGS. 4 and 5 are oblique views of an example belt trap 400, similar to the belt trap 130 discussed above. The belt trap 400 includes laterally offset side walls 402 and 404 and an end wall 406 extending between the side walls 402. The end wall 406 joins the side walls 402 and 404 at ends 408 thereof, forming a U-shaped structure. The side walls 402 and 404 and end wall 406 define a channel 410. In some implementations, the side walls 402 and 404 and the end wall 406 form a unitary component. For example, in some instances, the belt trap 400 is formed from a single piece of material, such as a metal, that is bent to form the side walls 402 and 404 and the end wall 406. Thus, in some implementations, the belt trap 400 is formed in a stamping operation. In other implementations, the belt trap 400 is formed in a casting operation. In some instances, the belt trap 400 is formed using one or more machining operation. Still further, in some instances, the belt trap 400 is formed form a composite material or a polymeric material.

Figure 6:
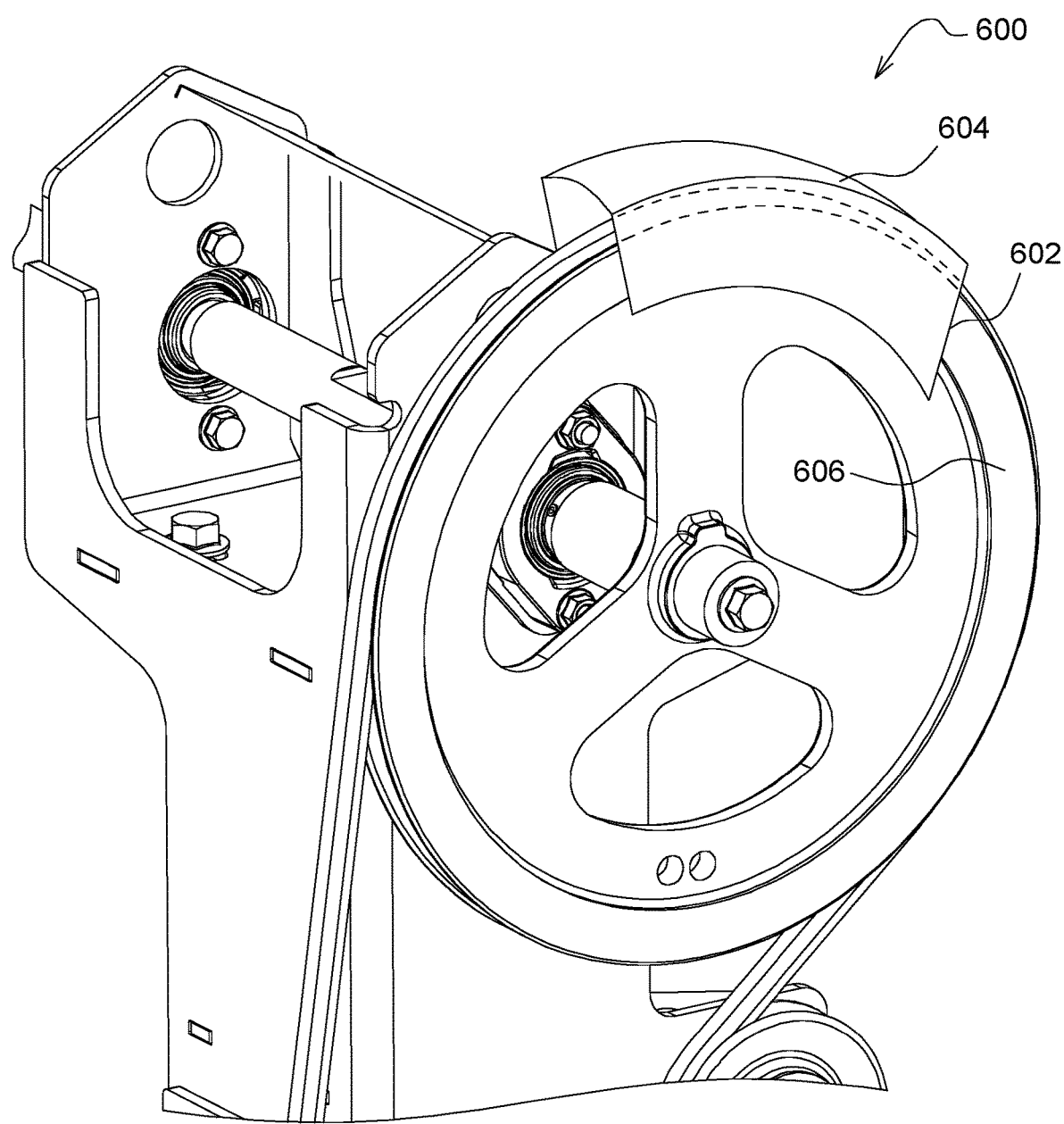
FIG. 6 is an oblique view of another example belt drive system that includes a belt trap having a wall that conforms to a perimeter of a pulley of the belt drive system, according to some implementations of the present disclosure.

The side walls 402 and 404 are nonparallel such that the channel 410 has a tapered shape. The channel 410 tapers towards the end wall 406. In this way, the side walls 402 and 404 act to funnel a severed drive belt towards the end wall 406 to facilitate engagement with protrusions 418 extending therefrom. The protrusions 418 are described in more detail below. In other implementations, the side walls 402 and 404 may have other arrangements. For example, in some instances, the side walls 402 and 404 may be parallel to each other. In some implementations the side walls 402 and 404 are flat. In other implementations, one or more of the side walls 402 and 404 may have a curved shape. FIG. 6 shows an example drive belt system 600 that includes a belt trap 602 in which the end wall 604 of the belt trap 602 has a curved shape that conforms to the circular shape of the pulley 606. In other instances, the end wall 604 may have other shapes.

Figure 7:
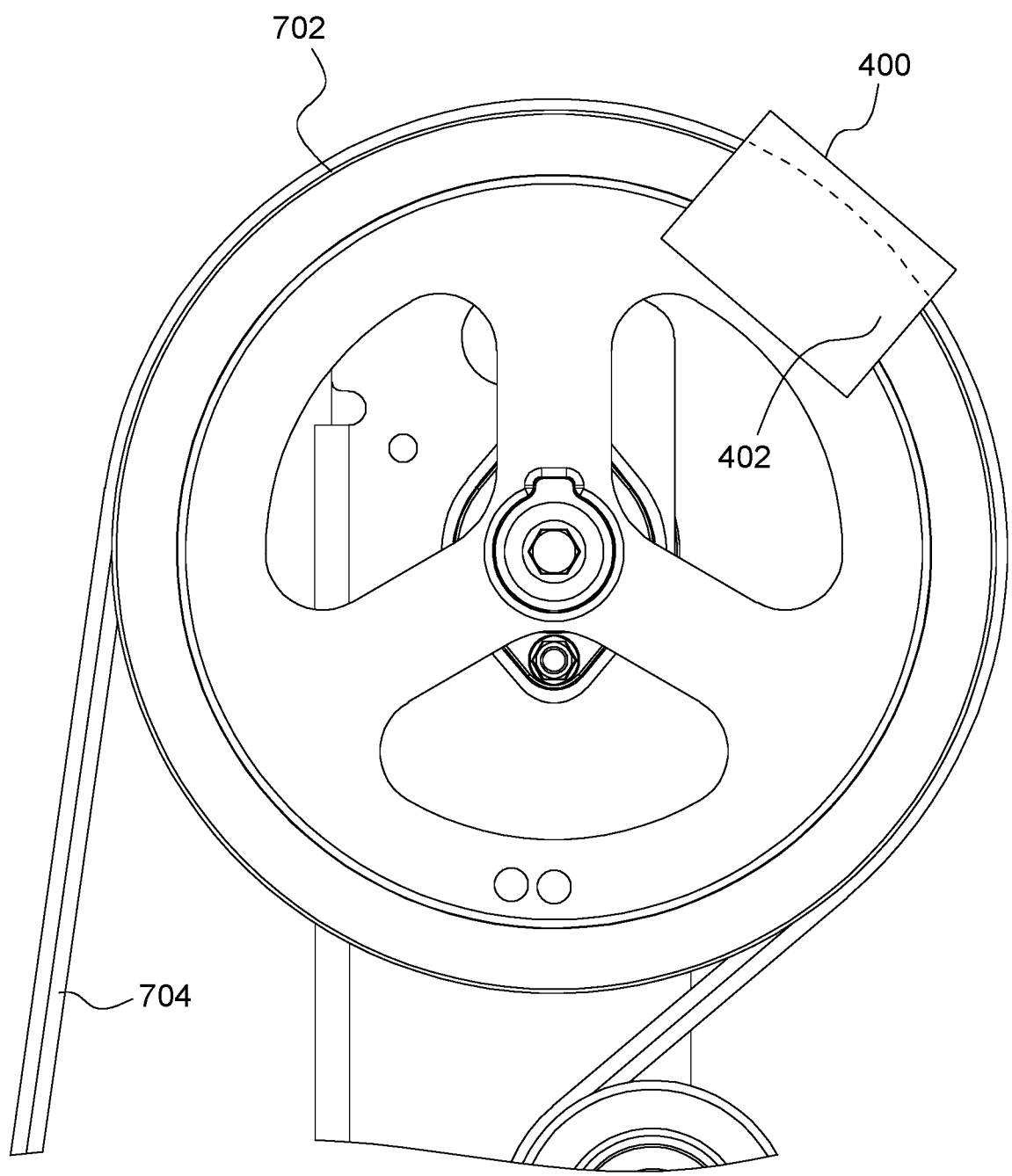
FIG. 7 is a side view of an example belt trap installed adjacent to a pulley of a belt drive system, according to some implementations of the present disclosure.

FIG. 7 shows a side view of the belt trap 400 installed adjacent to a pulley 700. The belt trap 400 is positioned relative to the pulley 700 such that a portion of the side walls 402 and 404 extend beyond the peripheral edge 702 of the pulley. It is believed that positioning the belt trap 400 in this way further enhances the likelihood that a severed drive belt, such as drive belt 704, will be captured by the belt trap 400 or at least retained between the belt trap 400 and the pulley 700 and, thereby, reduce the risk that the severed drive belt will strike and damage other components of the belt drive or objects adjacent to the belt drive.

Referring again to FIGS. 4 and 5, the belt trap 400 also includes a flange 412 extending from the side wall 404. The flange 412 includes apertures 414 to receive fasteners, such as bolts, that are used to couple the belt trap 400 to a bracket, such as bracket 132. In some instances, the apertures 414 form slots that provide for laterally adjusting a position of the belt trap 400, such as to align a longitudinal axis 416 of the belt trap 400 with centerline of the drive belt, such as centerline 136 of drive belt 126 shown in FIG. 2. In some instances, the longitudinal axis 416 is laterally centered relative to the end wall 406.

In other implementations, the belt trap 400 can be mounted in other ways. For example, in some instances, both side walls 402 and 404 can include a flange for securing the belt trap 400 into a position. In other instances, a mounting feature may be provided on one or more of the side walls 402 and 404 or the end wall 406. Thus, the belt trap 400 or others described herein can be mounted in any desired way to secure a position of the belt trap relative to the circuitous route traveled by the drive belt of a belt drive system, such as belt drive system 100.

The belt trap 400 also includes a plurality of protrusions 418 extending into the channel 410. In the illustrated example, the protrusions 418 are attached to the end wall 406 and extend from an interior surface 420 thereof into the channel 410. In the example shown, the belt trap 400 includes four protrusions 418. In other implementations, additional or fewer protrusions 418 may be included. For example, in some instances, a single protrusion 418 may be included. Further, although the protrusions 418 are shown attached to and extending from the end wall 406, in other implementation, the protrusion 418 may be attached to and extend into the channel 410 from one or both of the side walls 402 or 404. In still other instances, one or more protrusions 418 may be integrally formed with one or more of the side walls 402 and 404 and the end wall 406 and extend therefrom into or towards the channel 410.

In this example, the protrusions 418 are aligned longitudinally with the longitudinal axis 416 of the belt trap 400. As shown, the protrusions 418 are arranged in laterally adjacent pairs. Further, in some instances, the longitudinally aligned protrusions 418 are coupled together to form a protrusion assembly 421. Each of the protrusion assemblies 421 may be formed from a unitary component, such as a unitary piece of metal. Although each of the protrusion assemblies 421 includes two protrusions 418, in other implementations, a protrusion assembly 421 may include more than two protrusions 418. Each protrusion assembly 421 may include tabs 422 that are received into apertures 424 formed in the end wall 406. As mentioned above, though, in other implementations, one or more protrusions may be attached in a similar way to one or more of the side walls 402 and 404. The protrusions 418, such as in the form of protrusion assemblies 420, may be welded in place. For example, the tabs 422 may be welded to one or more edges defining the apertures 424. In other implementations, the protrusions 418, such as in the form of protrusion assemblies 421, may be secured to the end wall 406 (or side wall 402 or 404) using an adhesive. In some implementations, the protrusions 418 may be integrally formed with one or more of the end wall 406 or side walls 402 and 404.

In the illustrated example, the protrusions 418 have a common shape. In other implementations, the protrusions may have dissimilar shapes. As shown, the protrusions 418 have a concave edge 426 and a convex edge 428 that are joined at a corner that forms a spiked portion 430. In other instances, the edges of the protrusions 418 may have different shapes. For example, in some instances, the edges of the protrusions are straight. In some implementations, a protrusion may have a cylindrical form with a conical spiked portion, as illustrated in FIGS. 11 through 14. The pointed or spiked portion of the protrusions 418 are intended to pierce, retain, or otherwise capture a drive belt when the drive belt becomes severed. Alternatively, the protrusions 418 and remainder of the belt trap 400 are intended to absorb energy of a severed drive belt and otherwise reduce an amount of unconstrained motion of the severed drive belt.

When a drive belt, such as drive belt 112, becomes severed, the drive belt departs from the circuitous route, particularly the ends of the severed drive belt. As a result, the severed drive belt comes into contact with the belt trap, such as belt trap 130 or any other described herein, and, particularly, with the protrusions of the belt trap. As shown in the illustrated example of FIG. 4, the protrusions 406 are pointed and are intended to pierce and arrest movement of the severed belt. However, in cases where the protrusions are unable to arrest the belt, the protrusions and the other portions of the belt trap function to engage with the severed belt and absorb kinetic energy thereof in order to reduce the likelihood that the severed belt will contact and damage components near the belt drive system.

The belt trap 400 also includes a first edge 432 extending along a first end 434 of the belt trap 400 and a second edge 436 extending along a second end 438 of the belt trap 400. Each of the first edge 432 and second edge 436 extend along the side walls 402 and 404 and the end wall 406. As shown, a portion of the first edge 434 extending along the end wall 406 defines a protrusion 440 that forms a spike 441. Similar to the protrusion 418, the purpose of the protrusion 440 is to pierce, retain, or capture a severed drive belt or otherwise absorb kinetic energy of a severed drive belt.

Figure 8:
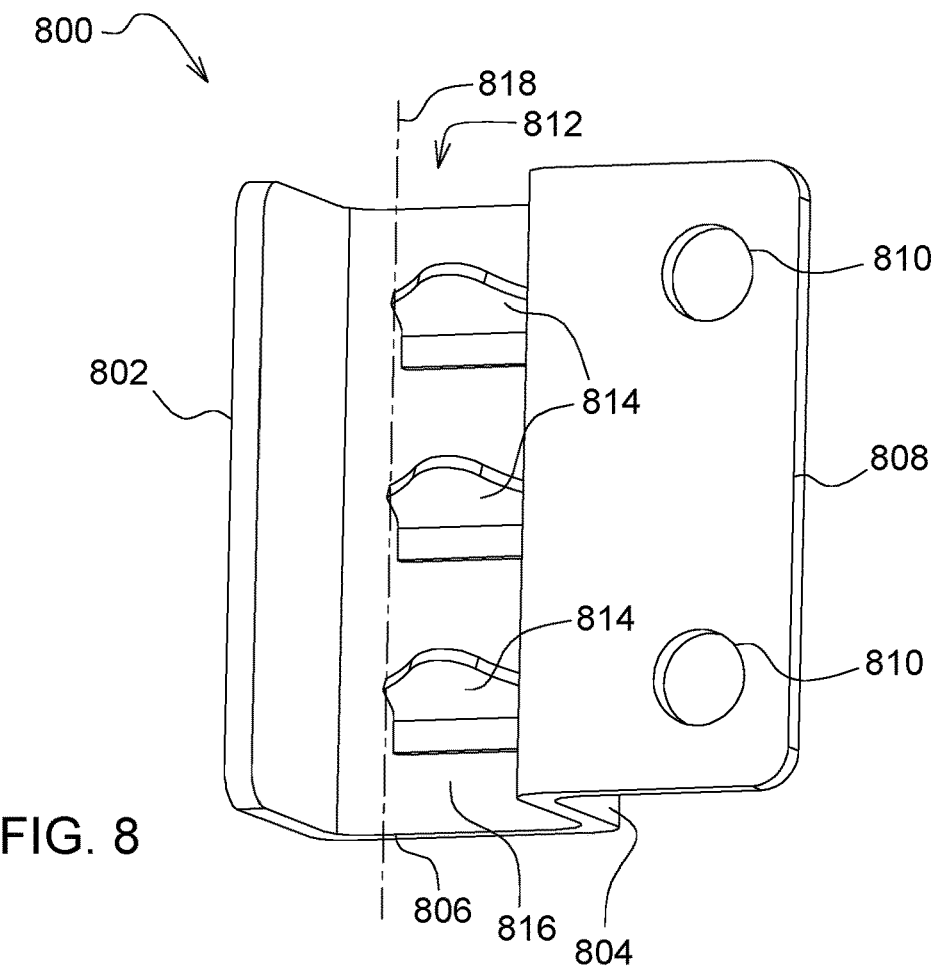
FIG. 8 is an oblique view of another example belt trap, according to some implementations of the present disclosure.

FIG. 8 is an oblique view of another example belt trap 800 that includes side walls 802 and 804, an end wall 806, and a flange 808 extending from side wall 804. The flange 808 includes apertures 810 for mounting the belt trap 800 to a bracket, such as a bracket similar to bracket 132 shown in FIGS. 2 and 3. In other examples, the belt trap 800 may be mounted at both end walls 802 and 804. In other implementations, the belt trap 800 may be mounted in other ways. For example, the belt trap 800 may be mounted at the end wall 806 or another location.

In this example, the side walls 802 and 804 offset and parallel to each other. In other implementations, the side walls 802 and 804 can be nonparallel. The end walls 802 and 804 and the end wall 806 define a channel 812. The belt trap 800 is mounted relative to a belt drive system such that a portion of a drive belt, which may be similar to drive belt 112, extends through the channel 812. The belt trap 800 also includes a plurality of protrusions 814 extending from an interior surface 816 of the end wall 806. In this example, the protrusions 814 are laterally oriented in the channel 812. For example, the protrusion 814 are oriented perpendicular to a longitudinal axis 818 extending longitudinally through the channel 812.

The protrusion 814 have a generally triangular shape with a blunted end portion 820. Protrusions having a blunted end portion may be used to avoid unintentional damage to a drive belt or pulley of a belt drive system, such as during installation of the belt trap or the drive belt. Further, the blunted end portion may still function to arrest or capture a severed drive belt or otherwise absorb kinetic energy of a severed drive belt to reduce the risk of damage caused by the severed drive belt. However, in other implementations, one more of the protrusion 814 form a pointed structure, such as that shown in FIG. 8, 10, or 11, that may be better suited to pierce a severed belt.

The protrusions 814 can be attached to the belt trap 800 using, for example, welding or an adhesive. For example, the protrusions 814 may include tabs (similar to tabs 422) that are received into apertures formed in the end wall 806 (similar to apertures 424) or another part of the belt trap 800. In other instances, the protrusions 814 may be integrally formed in the end wall 806 or another portion of the belt trap 800. For example, the protrusions 814 may be formed by deforming different portions of the end wall 806 to raise the portions of the wall relative to the remainder of the end wall 806. For example, a stamping technique may be used to form the protrusions 814 from the end wall 806 to form the protrusions 814 integrally with the end wall 806. In other instances, the protrusions 814 may be attached to the end wall 806 (or another part of the belt trap 800) or formed in the belt trap 800 in other ways.

Further, in the illustrated example, three protrusion 814 are provided. In other implementations, additional or fewer protrusions 814 are used. Also, the protrusion 814 have identical forms. In other implementations, the protrusions 814 can have different forms. Additionally, the protrusions 814 are arranged longitudinally in a single file. In other implementations, one or more of the protrusions 814 may also be laterally aligned with another protrusion 814.

Figure 9:
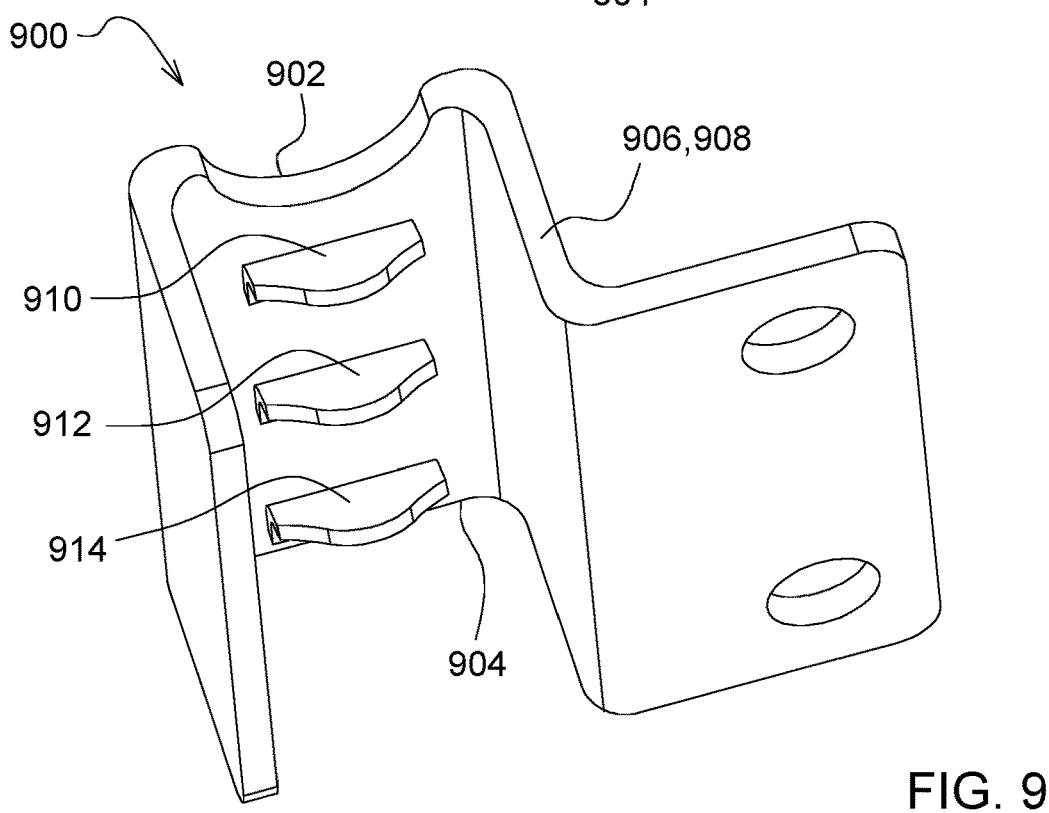
FIG. 9 is an oblique view of another example belt trap, according to some implementations of the present disclosure.

FIG. 9 is another example belt trap 900 that is similar to the belt trap 800 except that the belt trap 900 includes a recess 902 in an end wall 904. The recess 902 reduces a distance between an edge 906 along a first end 908 of the belt trap 900 and the protrusion 910 adjacent to the edge 906. The recess 902 is included to increase the likelihood that a severed belt will come into contact with the protrusion 910. As this distance is increased, it is believed that a curvature formed in a severed drive belt when the severed drive belt impacts the edge 906 may prevent contact between one or more of the protrusions 910, 912, or 914, thereby reducing the efficacy of the belt trap 900 in arresting the severed drive belt or absorbing kinetic energy of the severed drive belt. The variations discussed herein with respect to other example belt traps are also applicable to belt trap 900.

Figure 10:
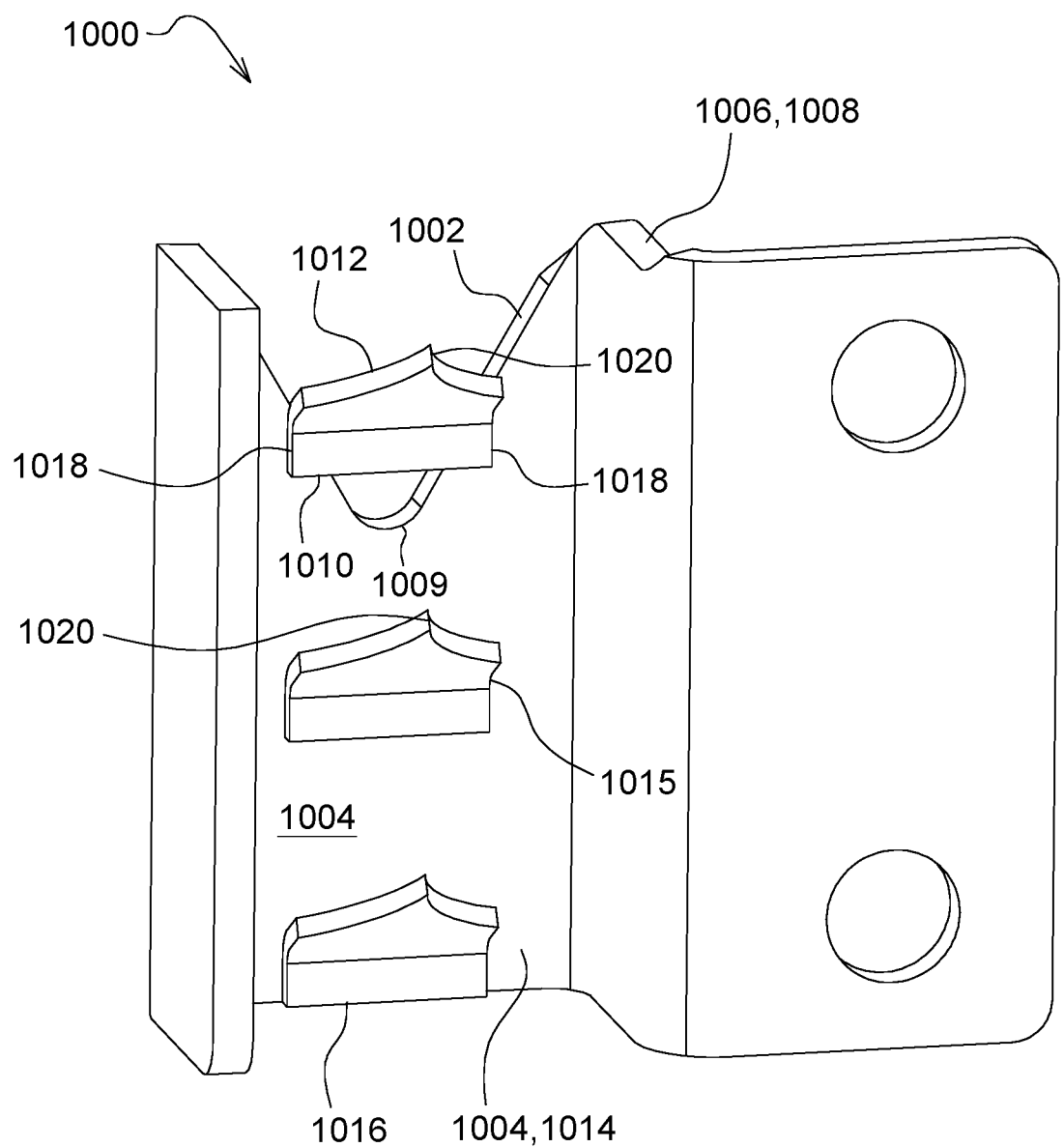
FIG. 10 is an oblique view of another example belt trap, according to some implementations of the present disclosure.

FIG. 10 is an oblique view of another example belt trap 1000. The belt trap 1000 is similar to belt trap 800 with the following differences. The belt trap 1000 includes a V-shaped notch 1002 in an end wall 1004 that extends from an edge 1006 at a first end 1008 of the belt trap 1000 to a location where a trough 1009 of the notch 1002 extends beyond an end 1010 of a protrusion 1012. The protrusion 1012 is formed on or attached to an interior surface 1014 the end wall 1004. Similar to the notch 904, the notch 1002 increases the likelihood that a severed belt will engage the protrusion 1012, protrusion 1015, or protrusion 1016 as opposed to striking and being deflected by the edge 1006. Although a notch having a V-shape is described, notches having other shapes, such as, for example, an elliptical recess, can also be included.

The protrusion 1012 laterally extends across the notch 1002 and is secured to the end wall 1004 at laterally opposing ends 1018 of the protrusion 1012. The protrusion 1012 may be attached, for example, by welding or with the use of an adhesive. Other joining method may also be used. In this example, the protrusions 1012 and 1016 includes pointed portions 1020 to engage a severed belt to arrest or otherwise absorb kinetic energy thereof. As shown, both protrusions 1012 and 1016 are identical. In other implementations, one or more of the protrusions may have a different shape, such as one or more of the different forms described herein. Although three protrusions are shown, in other implementations, the belt trap 1000 may have additional or fewer protrusions. The belt trap 1000 can be modified in one or more of the ways described herein.

Figure 11:
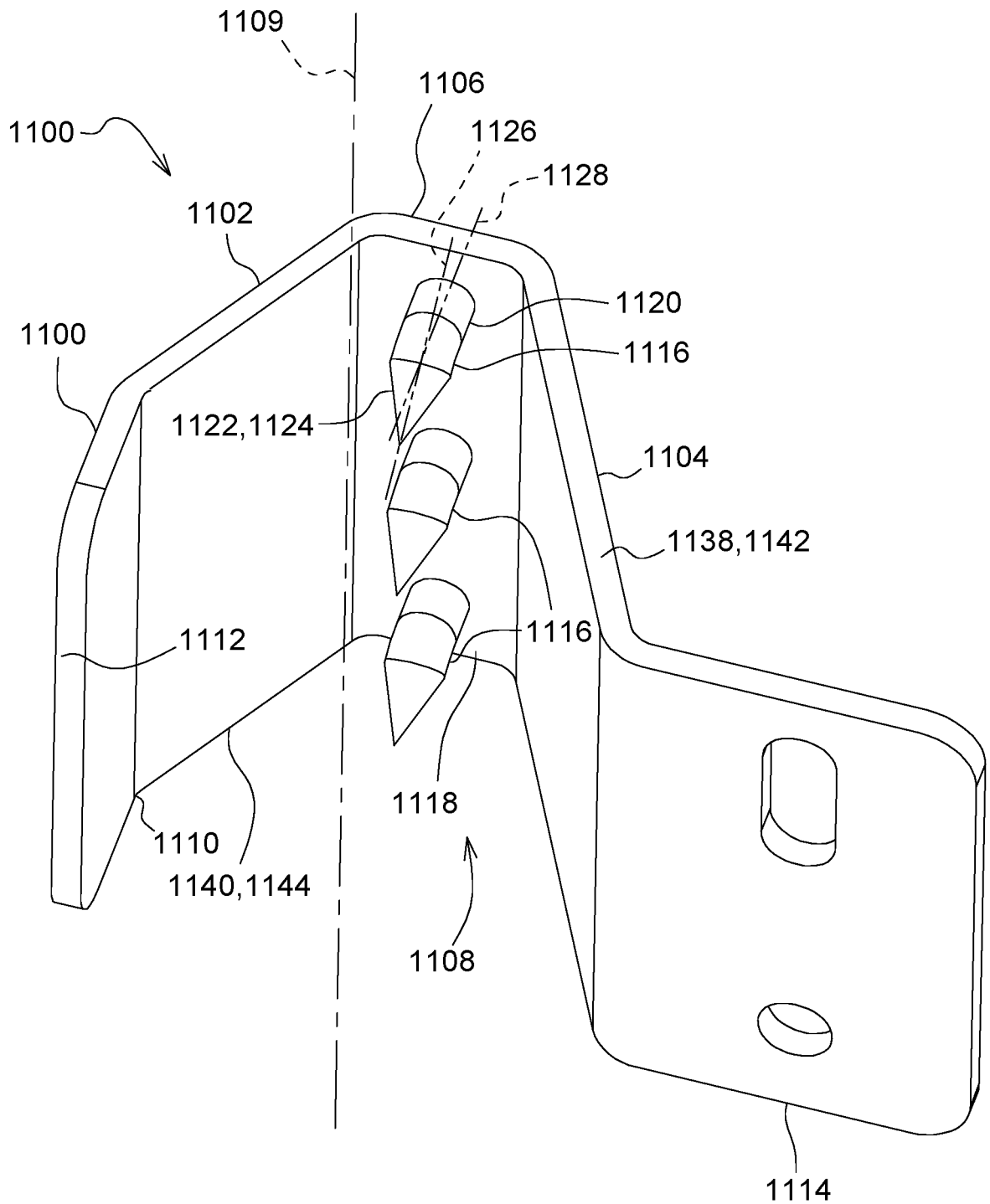
FIG. 11 is an oblique view of another example belt trap, according to some implementations of the present disclosure.
Figure 12:
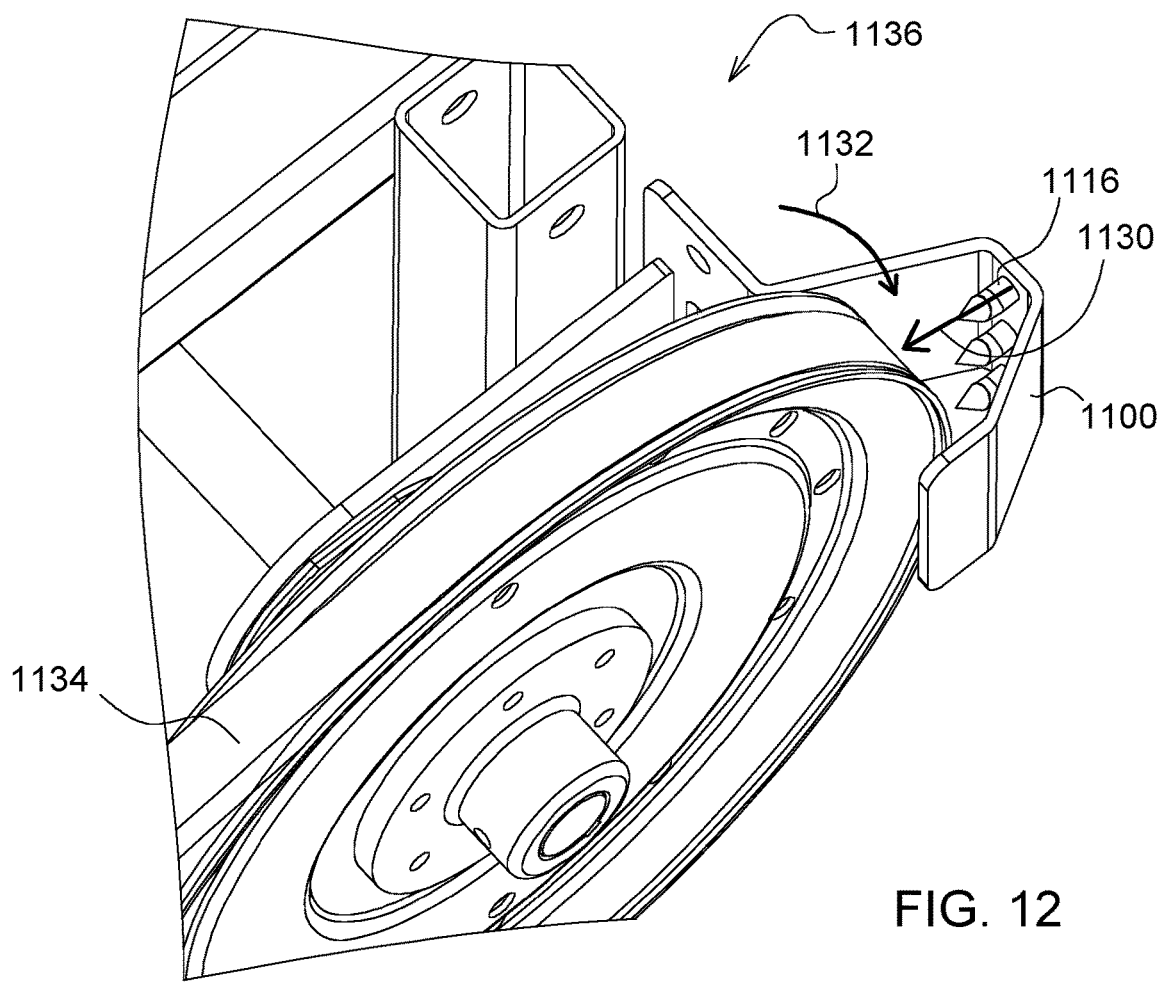
FIG. 12 is a detail view of an example belt drive system with the belt trap of FIG. 11 installed therein.

FIG. 11 is another example belt trap 1100 that has a configuration similar to the belt traps 130 and 400. The belt trap 1100 includes a first side wall 1102 and a second side wall 1104 joined by an end wall 1106. The first side wall 1102 and the second side wall 1104 are nonparallel to define a tapered channel 1108. In some implementations, the side walls 1102 and 1104 may be parallel to each other. The channel 1108 defines a longitudinal axis 1109. In this example, the side wall 1102 includes a bend 1110 and an end portion 1112 extending distally from the bend 1110. In some implementations, the end portion 1112 extends perpendicularly to an outer surface of a drive belt (e.g., outer surface 138 of drive belt 112, shown in FIG. 2) when the belt trap 1100 is installed in a belt drive system. In some instances, when the belt trap 1100 is installed in a belt drive system, the end portion 1112 may be parallel with a side surface defined by a pulley of the belt drive system. When installed in a belt drive system, a portion of a drive belt extends longitudinally through the channel 1108.

In the present example, the walls 1102, 1104 and 1106 are shown as faceted portions of a continuous piece of material, such as a piece of metal that has been shaped to form the different walls. Thus, the walls 1102, 1104, and 1106 may be viewed as a single wall continuous wall that includes different wall portions identified with reference numbers 1102, 2204, and 1106. In other implementations, belt traps within the scope of the present disclosure may include a single wall that is curved, such as in the shape of an ellipse or a parabola or has a semi-circular shape for wrapping around a portion of a drive belt. In other implementations, the single wall may have other shapes that form a continuous component for surrounding, at least partially, a portion of a drive belt.

The belt trap 1100 includes a flange 1114 coupled to the side wall 1104. The flange 1114 is used to connect the belt trap 1100 to a bracket, for example, or another component for securing the belt trap in position relative to a drive belt of a belt drive system. In other implementations, the belt trap 1100 includes one or more other or different mounting features to secure the belt trap 1100 in a desired position relative to a belt drive system.

The belt trap 1100 includes a plurality of protrusions 1116 extending from an inner surface 1118 of the end wall 1106. In this example, the protrusions 1116 include a cylindrical portion 1120 with a conical spiked portion 1122 at a distal end 1124 of the cylindrical portion 1120. In some implementations, the spiked portion 1122 is angled relative to the cylindrical portion 1120. That is, a longitudinal axis 1126 of the spiked portion 1122 defines an oblique angle relative to a longitudinal axis 1128 of the cylindrical portion 1120. The belt trap 1100 may be installed such that the spiked portion 1122 is angled in a direction 1130 towards a direction of motion 1132 of a drive belt 1134 of a belt drive system 1136, as shown, for example, in FIG. 12.

As shown, the belt trap 1100 includes three identical protrusions 1116. In other implementations, the belt trap 1100 may include additional or fewer protrusions 1116. In some instances, one or more of the protrusions 1116 may be different than one or more other protrusions 1116. In other implementations, one or more or all of the protrusions 1116 may extend from another portion of the belt trap 1100, such as from one or more of the side walls 1102 and 1104 or from an edge 1138 or 1140 of a first end 1142 or a second end 1144, respectively, of the belt trap 1100.

Figure 13:
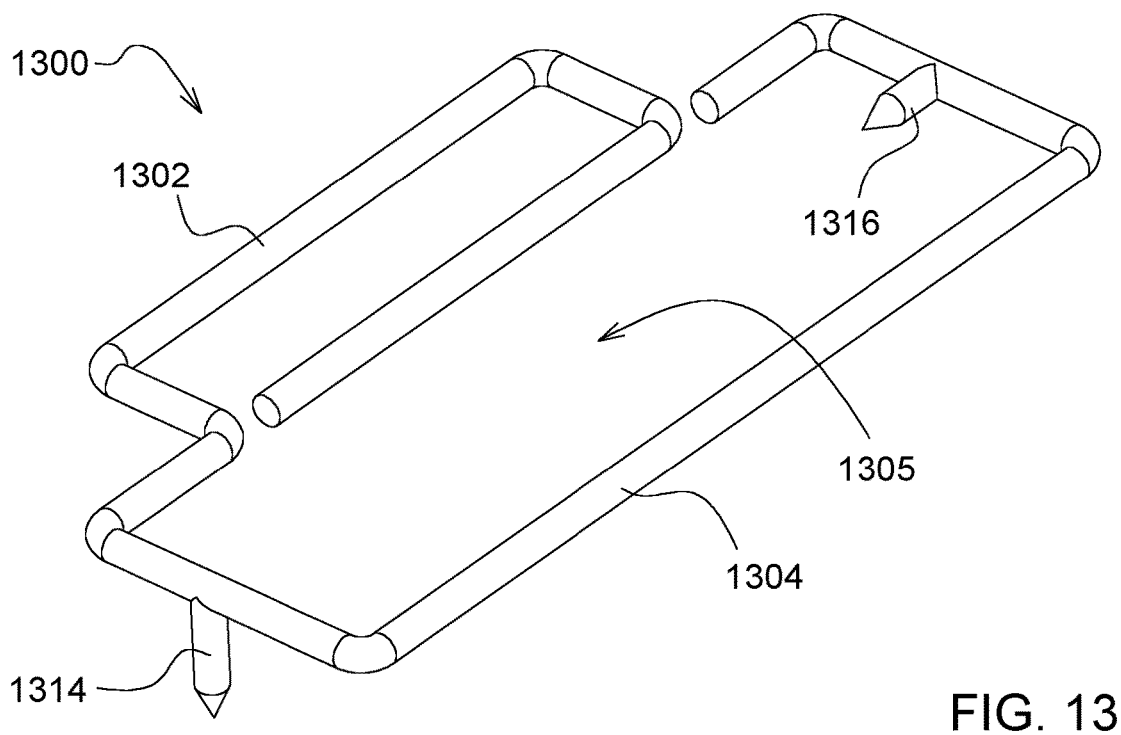
FIG. 13 is an oblique view of another example belt trap, according to some implementations of the present disclosure.
Figure 14:
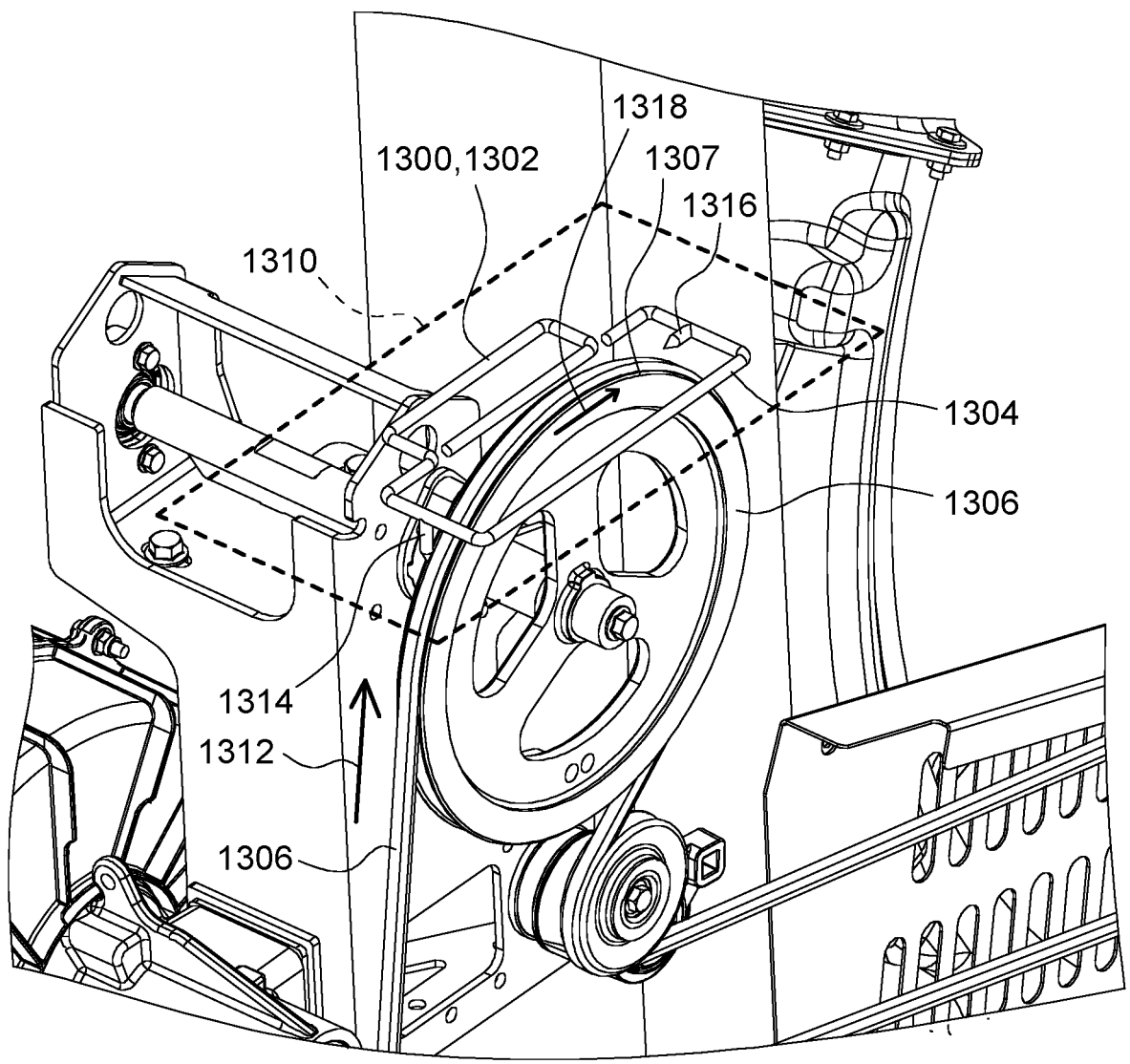
FIG. 14 is a detail view of an example belt drive system with the belt trap of FIG. 13 installed therein.

FIGS. 13 and 14 show another example belt trap 1300. The belt trap 1300 is formed with a wireframe construction. For example, the belt trap 1300 is formed from a continuous wire or rod that is bent to form the illustrated planar shape or another shape that resides at a location along a belt drive system. Although a planar shape is shown and described, other shapes, including nonplanar shapes, using wireframe construction are within the scope of the present disclosure. The belt trap 1300 includes a mounting portion 1302 that is has a generally rectangular shape and a belt straddling portion 1304 that is sized and shaped to receive a portion of a drive belt installed in a belt drive system. In the illustrated example, the straddling portion 1304 defines an opening 1305 that is sized and shaped to receive a portion of a pulley 1306. Particularly, in the illustrated example, the belt trap 1300 can be installed along a perimeter 1307 of the pulley 1306, as shown in FIG. 14, such that a portion of the pulley 1306 and drive belt 1308 pass through a plane 1310 defined by the straddling portion 1304. In this example, the drive belt 1308 moves in a direction of arrow 1312.

The belt trap 1300 includes protrusions 1314 and 1316 that are oriented in a direction relative to the motion of a drive belt that is generally opposite to the direction of travel of the drive belt 1308. The protrusions 1314 and 136 are oriented such that the protrusions 1314 and 1316 are likely to engage with or capture one or more portions of a severed drive belt or otherwise absorb kinetic energy of a severed drive belt. In the illustrated example, the protrusion 1314 extends in a direction parallel or approximately parallel but opposite to the direction of movement of the drive belt 1308 at a location near the protrusion 1314, represented by arrow 1312. Similarly, the protrusion 1316 extends in a direction parallel or approximately parallel but opposite to a direction of movement of the drive belt 1308 around the perimeter 1307 of the pulley 1306 near the protrusion 1316 but in an opposite direction thereof, represented by arrow 1318.

Figure 15:
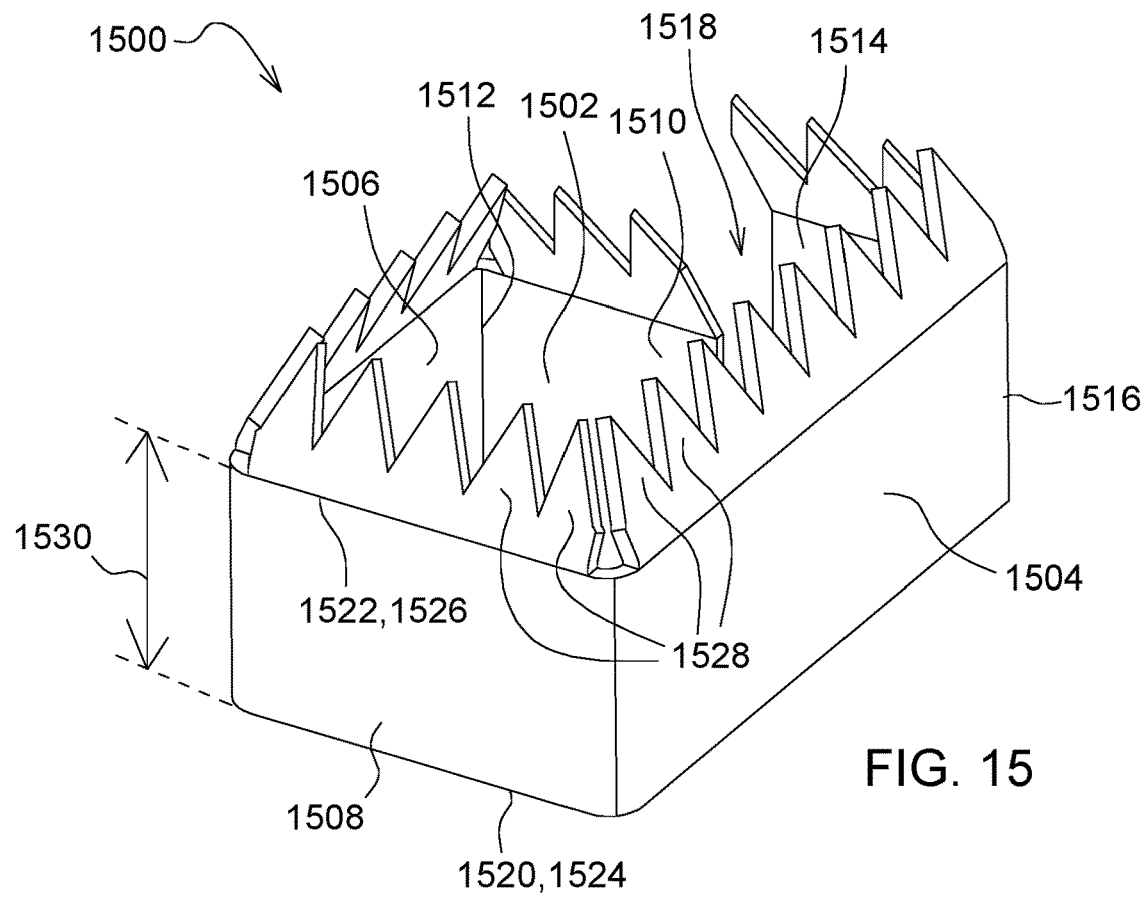
FIG. 15 is an oblique view of another example belt trap, according to some implementations of the present disclosure.
Figure 16:
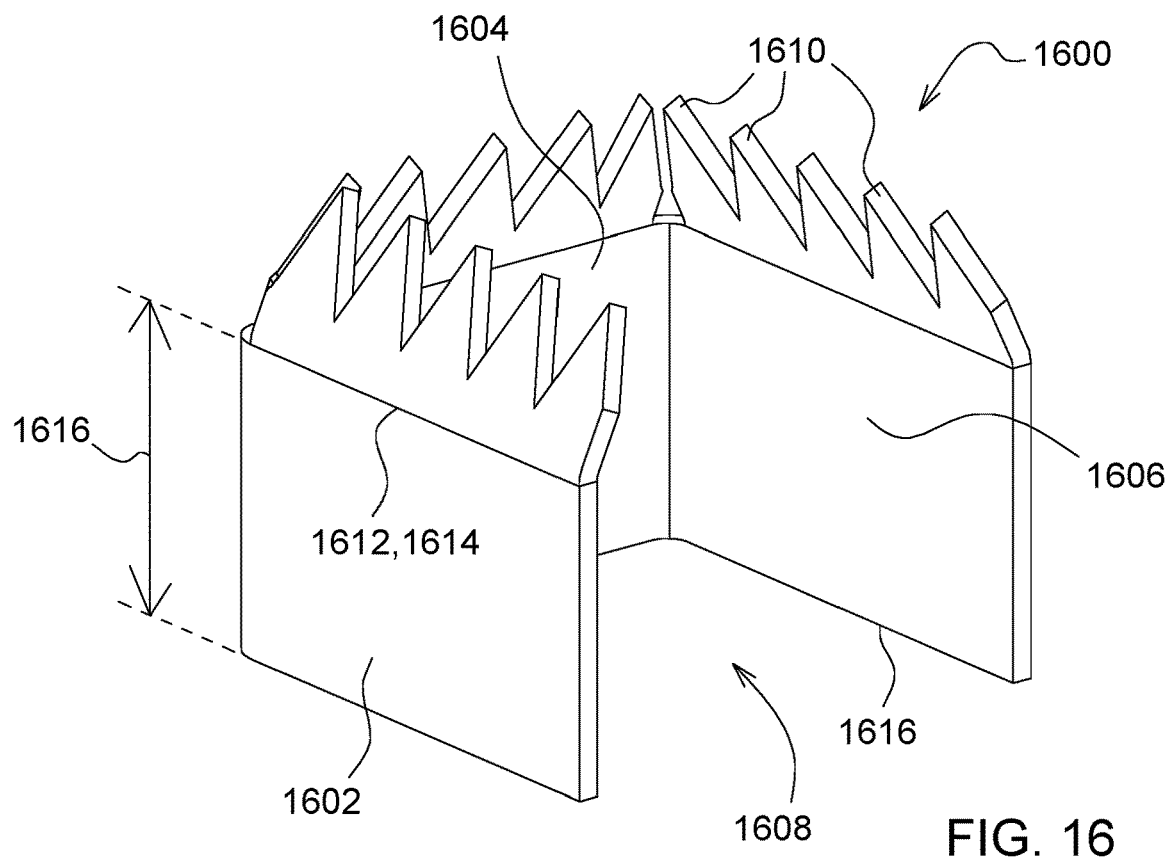
FIG. 16 is an oblique view of another example belt trap, according to some implementations of the present disclosure.
Figure 17:
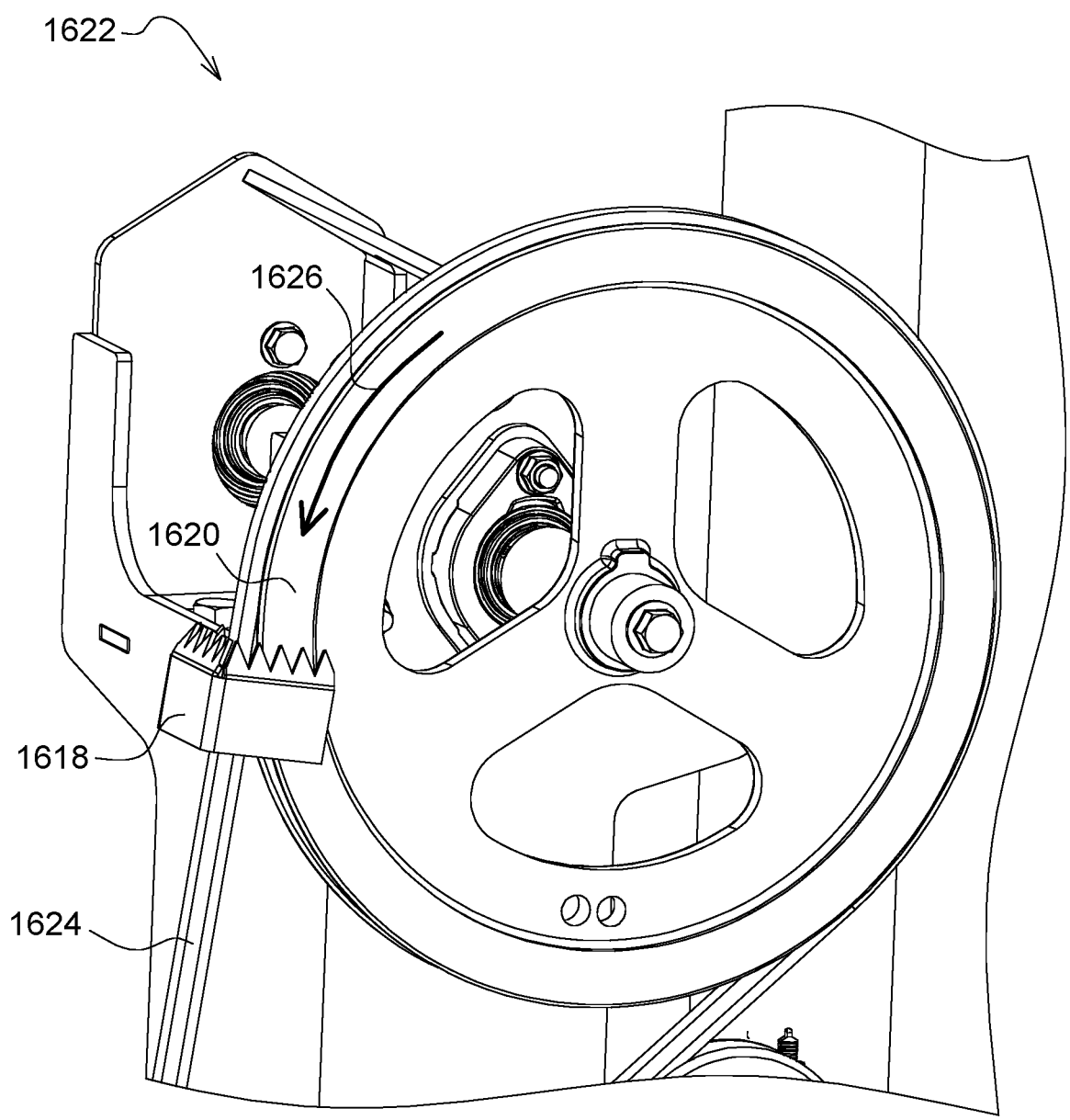
FIG. 17 is a detail view of an example belt drive system with the belt trap of FIG. 16 installed therein.

FIGS. 15 through 20 show other example belt traps within the scope of the present disclosure. The example belt traps shown in FIGS. 15 through 20 are configured to be located along a drive belt of a belt drive system away from a pulley. However, the designs of these examples can be altered such that one or more of these belt trap designs can be positioned adjacent to a pulley of a belt drive system. For example, belt trap 1500, shown in FIG. 15, can be altered in a manner similar to that shown in FIG. 16 to wrap around a perimeter a perimeter of a pulley, as shown in FIG. 17. Consequently, these design alterations are within the scope of the present disclosure.

FIG. 15 is an oblique view of another example belt trap 1500 that has a general quadrilateral shape that defines a channel 1502 that is sized and shape to receive a drive belt. The drive belt passes through the channel 1502. The belt trap 1500 includes opposing walls 1504 and 1506 that, in this example, have different lengths. Particularly, wall 1504 is longer than wall 1506. A wall 1508 extends between opposing walls 1504 and 1506. A wall 1510 extends from an end 1512 of the wall 1506 and is disposed opposite wall 1508, and a wall 1514 extends from an end 1516 of the wall 1504 and is also disposed opposite wall 1508. A gap 1518 is formed between walls 1510 and 1514 as a result of the different lengths of walls 1504 and 1506. The gap 1518 permits a drive belt to be inserted into the channel 1502.

The belt trap 1500 also includes opposing ends 1520 and 1522, defining respective edges 1524 and 1526. A plurality of protrusions 1528 are arranged along the edge 1526. In the illustrated example, the protrusions 1528 extend along an entirety of the edge 1526. In other instances, the protrusions 1528 may be included on less than entirety of the edge 1526. For example, in some instances, the protrusions 1528 are included on one or more different portions of the edge 1526 while not on other portions of the edge 1526. Further, in some implementations, protrusions 1528 may be included on other parts of the belt trap 1500, such as extending from a surface of one or more of the walls 1504, 1506, 1508, 1510, or 1514. The protrusions 1528 extend inwardly at an angle relative to the walls 1504, 1506, 1508, 1510, and 1514. In some implementations, one or more of the protrusions 1528 may be angled outwardly. The protrusions 1528 are angled towards the channel 1502 and, thus, towards a drive belt passing through the channel 1502. The belt trap 1500 is positioned such that the protrusions 1528 generally extend in a direction opposite a direction of movement of a drive belt passing through the channel 1502. In this configuration, it is believed that the protrusions 1528 are better positioned to engage a severed belt and capture or reduce the kinetic energy of the severed drive belt.

In the illustrated example, the protrusion 1528 have a spiked form with a triangular shape. The illustrated shape may be particularly applicable to sheet metal forming techniques. However, in other implementations, the protrusion 1528 may have other shapes, such as one or more of the other shapes defined herein. Further, the scope of the shape of the protrusions 1528 is intended to encompass any shape that is likely to arrest a severed drive belt or otherwise absorb kinetic energy of the severed drive belt.

FIG. 16 shows another belt trap 1600 similar to the belt trap 1500, except that the belt trap 1600 omits the walls similar to walls 1510 and 1514. The belt trap 1600 includes three walls 1602, 1604, and 1606 formed in a U-shape defining a channel 1608. The belt trap 1600 also includes a plurality of protrusions 1610 extending along an edge 1612 formed at an end 1614, opposite an end 1616. The protrusions 1610 are angled inwardly towards the channel 1608 relative to the respective walls 1602, 1604, and 1606. The belt trap 1600 can be located adjacent to a perimeter 1618 of a pulley 1620 in a belt drive system 1622, as shown, for example, in FIG. 17. The belt trap 1600 can be mounted into position at one or more of the walls 1602, 1604, and 1606. For example, the belt trap 1600 may be mounted into position using one or more brackets that attach to one or more of the walls 1602, 1604, or 1606.

As shown in FIG. 17, similar to the belt trap 1500, the belt trap 1600 is oriented such that the protrusions 1610 extend in a direction generally opposite to that of the direction of motion of drive belt 1624, indicated by arrow 1626. Although the protrusions 1610 are included along an entirety of the edge 1610, in other implementations, protrusions 1610 may extend along less than an entirety of the edge 1610. For example, in some instances, the protrusions 1610 may extend along one or more portions of the edge 1612 and not along other portions of the edge 1612. In some implementations, protrusions 1510 may be included on other parts of the belt trap 1600, such as extending from a surface of one or more of the walls 1602, 1604, or 1606.

Figure 18:
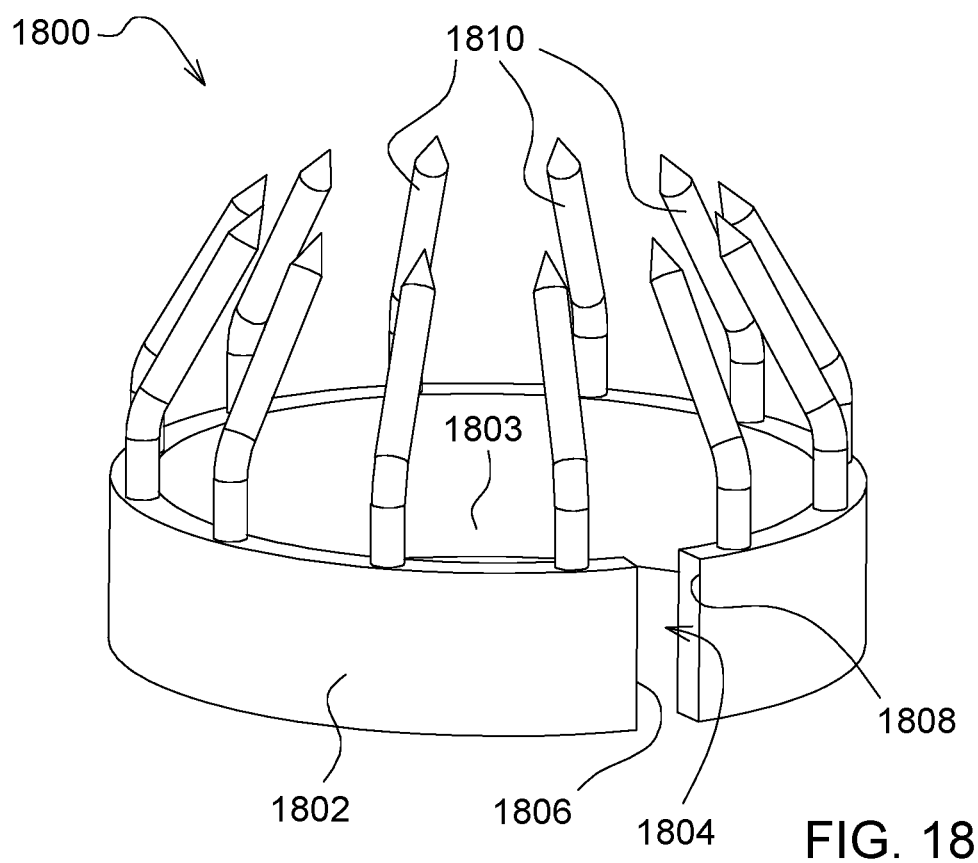
FIG. 18 is an oblique view of another example belt trap, according to some implementations of the present disclosure.

FIG. 18 is an oblique view of another example belt trap 1800 in the form of a ring. The belt trap 1800 includes a wall 1802 that forms a ring defining a channel 1803. A gap 1804 is formed in the wall 1802 between ends 1806 and 1808 of the wall 1802. The gap 1804 provides an entry location for inserting a drive belt into the channel 1803. A plurality of protrusions 1810 extend from an edge 1812 formed at an end 1814 of the wall 1802. In the illustrated example, the protrusions 1810 are arranged along an entirety of the edge 1812. In other implementations, as described in the context of other examples herein, the protrusions 1810 may be provided on one or more portions of the edge 1812 and not on one or more other portions of the edge 1812. The protrusions 1810 are in the form elongated spikes. However, the protrusions 1810 may have other forms, such as one or more of the forms described herein or otherwise within the scope of the present disclosure. In some implementations, one or more of the protrusions 1810 may extend from a surface of the wall 1802. The belt trap 1800 can be mounted into position relative to a drive belt, such as along a perimeter of a pulley or elsewhere in a belt drive system, with one or more brackets coupled to the wall 1802.

Figure 19:
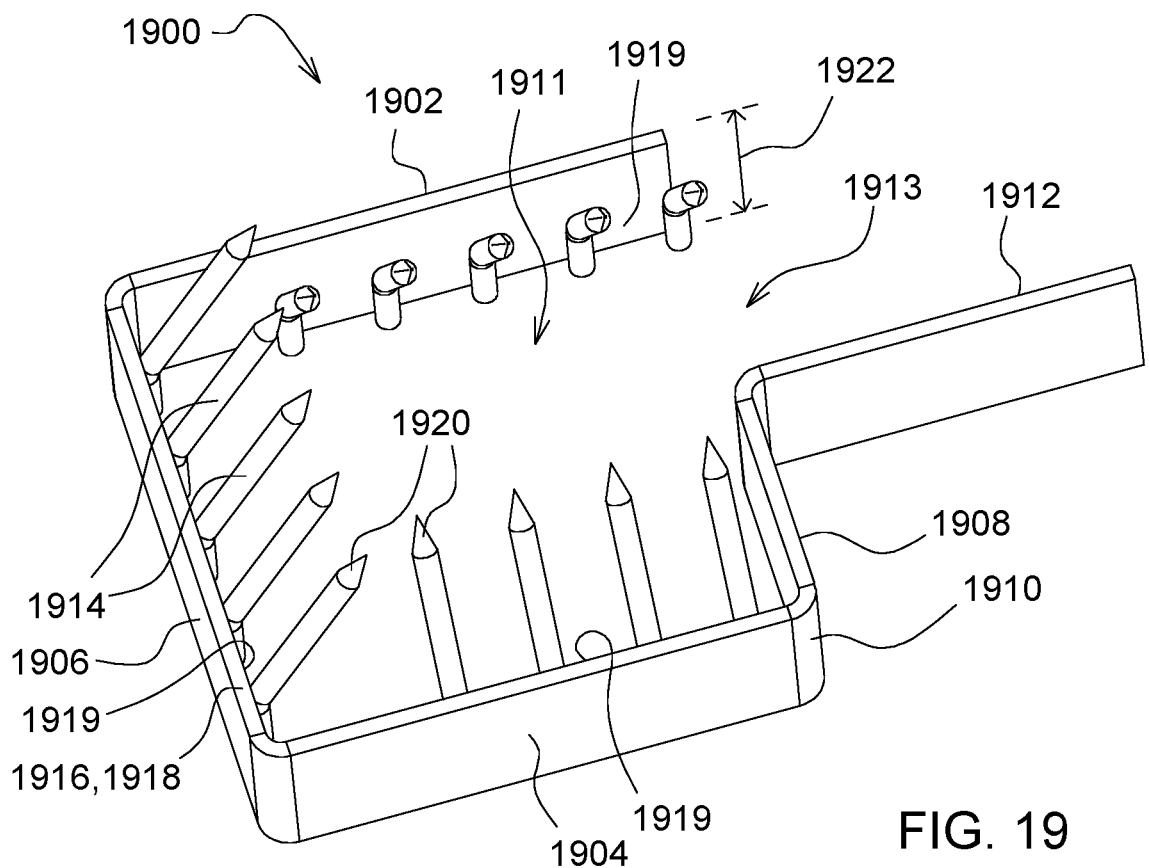
FIG. 19 is an oblique view of another example belt trap, according to some implementations of the present disclosure.

FIG. 19 is an oblique view of another example belt trap 1900. The belt trap 1900 has a generally quadrilateral shape including opposing walls 1902 and 1904 with a wall 1906 extending therebetween. A wall 1908 extends from an end 1910 of the wall 1904 and is disposed opposite the wall 1906. A mounting tab 1912 extends from the wall 1908. In some implementations, the mounting tab 1912 is omitted. In some implementations, more than one mounting tab is included for mounting the belt trap 1900 to a location. Thus, in some implementations, the belt trap 1900 can be mounted in other ways. For example, in some instances, one or more mounting brackets or other structures can be coupled to one or more of the walls 1902, 1904, 1906, or 1908.

The walls 1902, 1904, 1906, and 1908 define a channel 1911 and a gap 1913. The channel 1911 is sized to receive a portion of a drive belt of a belt drive system, and the gap 1913 is sized to allow insertion of the drive belt into the channel 1911.

The belt trap 1900 also includes a plurality of protrusions 1914 that extend beyond an edge 1916 at a first end 1918 of the belt trap 1900. The protrusions 1914 extend along and are coupled to an interior surface 1919 of the respective walls 1902, 1904, and 1906. The plurality of protrusions 1914 extend along an entire perimeter of the channel 1911. In other implementations, the protrusions 1914 may extend along one or more portions of the perimeter of the channel 1911 and may be omitted from one or more other portions along the perimeter of the channel 1911. In this example, the protrusions 1914 have an elongated form with a spiked end 1920. In other implementations, one or more of the protrusions 1914 may have other forms, such as one or more of the other forms described herein or otherwise within the scope of the present disclosure. In still other implementations, one or more protrusions 1914 are included at one or more other locations of the belt trap in addition to or to the exclusion of the protrusions 1914 arranged along the interior surfaces 1919 of the walls 1902, 1904, and 1906.

The protrusions 1914 have a bent shape and are angled inwardly towards the channel 1911 forming an angle relative to the respective walls one which the protrusions 1914 are mounted. In other implementations, one or more of the protrusions 1914 are oriented differently relative to the channel 1911. In some implementations, when installed the protrusions 1914 extend in a direction that is generally opposite a direction of movement of a drive belt passing through the channel 1911.

In the illustrated example, a height 1922 of the walls 1902, 1904, 1906, and 1908 is different, e.g., less, than a height 1530 of the belt trap 1500 and a height 1616 of the belt trap 1600. In other implementations, the height 1922 is different. For example, in some implementations, the height 1922 can be increased or decreased. For example, in some instances, the height 1922 may be the same, greater than, or less than the heights 1530 of belt trap 1500 or the height 1616 of the belt trap 1600. Moreover, the height of the various other belt traps described herein or otherwise within the scope of the present disclosure may be any desired size.

Figure 20:
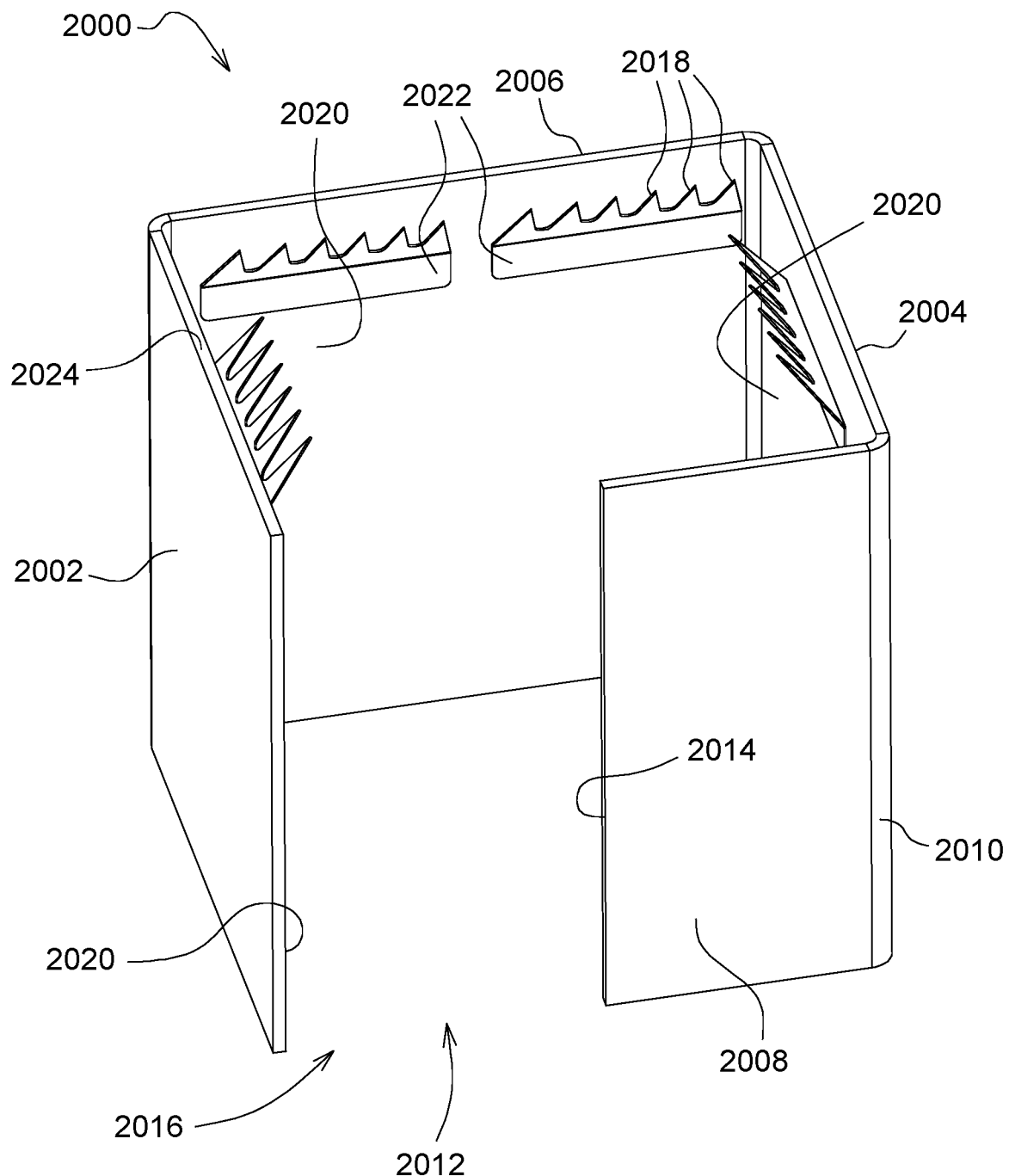
FIG. 20 is an oblique view of another example belt trap, according to some implementations of the present disclosure.

FIG. 20 is an oblique view of another example belt trap 2000. The belt trap 2000 includes a wall 2002, a wall 2004 opposite wall 2002, a wall 2006 extending between walls 2002 and 2004, and a wall 2008 extending from an end 2010 of the wall 2004. The wall 2008 is disposed opposite to the wall 2006 and defines a gap 2012 between an end 2014 of the wall 2008 and the wall 2002. The walls 2002, 2004, 2006, and 2008 define a channel 2016. The gap 2012 is sized to permit insertion of a drive belt into the channel 2016.

The belt trap 2000 also includes a plurality of protrusions 2018 attached to interior surfaces 2020 of the walls 2002, 2004, and 2006. In the illustrated example, the protrusions 2018 are arranged in segments 2022 having a number of integrally formed protrusions 2018. In some implementations, the segments 2022 are attached to the interior surfaces 2020, such as by welding or an adhesive. Further, the segments 2022 may be attached in any desired way. In some instances, the protrusions 2018 are portions of the respective walls 2002, 2004, and 2006 that are bent inwardly towards the channel 2016. In some implementations, the wall 2008 includes one or more protrusions 2018. The protrusions 2018 are angled inwardly relative to the respective walls 2002, 2004, and 2006 towards the channel 2016. In some implementations, when installed the protrusions 2018 extend in a direction that is generally opposite a direction of movement of a drive belt passing through the channel 2016. In the illustrated example, the protrusions 2018 do not extend beyond the end 2024 of the belt trap 2000. In other implementations, one or more of the protrusions 2018 does extend beyond the end 2024.

The belt trap 2000 may include one or more features to mount the belt trap 2000 into a desired position, such as a position relative to a drive belt in a belt drive system. In some instances, one or more brackets may couple to one or more of the walls 2002, 2004, 2006, and 2008.

Without in any way limiting the scope, interpretation, or application of the claims appearing below, a technical effect of one or more of the example implementations disclosed herein is to avoid damage to a belt drive system or other objects adjacent to a belt drive system by capturing a severed drive belt or absorbing energy of a severed drive belt with one or more belt traps. Another technical effect of one or more of the example implementations disclosed herein is to reduce costs associated with a drive belt failure. Another technical effect of one or more of the example implementations disclosed herein is to provide one or more belt traps to capture, arrest, or absorb kinetic energy of a drive belt such as in instances where a bulkier drive belt guard is not feasible.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. A belt trap mountable in a belt drive system adjacent to a portion of a drive belt of the belt drive system, the belt trap comprising:
   a first wall;
   a second wall disposed opposite the first wall; and
   a third wall extending between the first wall and the second wall,
   wherein the first wall, the second wall, and the third wall define a U-shaped structure,
   wherein the U-shaped structure is configured to straddle the drive belt such that the first wall is configured to be disposed proximate to a first lateral edge of the drive belt, the second wall is configured to be disposed proximate to a second lateral edge of the drive belt, opposite the first lateral edge, and the third wall is configured to be disposed adjacent an outer surface of the drive belt,
   a channel defined by the first wall, the second wall, and the third wall; and
   a protrusion extending from the third wall, the protrusion extending into the channel.

2. The belt trap of claim 1, wherein the U-shaped structure defines a first end and a second end,
   wherein the protrusion comprises a plurality of protrusion, and
   wherein the plurality of protrusions are arranged along an edge of the first wall formed at the first end of the channel or the second end of the channel.

3. The belt trap of claim 1,
   wherein the protrusion extends from an interior surface of the third wall.

4. The belt trap of claim 1, wherein the first wall and the second wall are nonparallel.

5. The belt trap of claim 1, wherein the protrusion comprises a plurality of protrusions extending from the interior surface of the first wall.

6. The belt trap of claim 1, wherein the protrusion defines a generally triangular shape.

7. The belt trap of claim 1, wherein the protrusion is transversely oriented relative to the channel.

8. The belt trap of claim 1, wherein the protrusion is longitudinally oriented relative to the channel.

9. The belt trap of claim 1, wherein the first wall comprises an edge that defines a peak.

10. A belt trap mountable in a belt drive system adjacent to a portion of a drive belt of the belt drive system, the belt trap comprising:
    a first wall;
    a channel defined, at least in part, by the first wall; and
    a protrusion extending from the first wall, the protrusion extending into the channel,
    wherein the protrusion defines a spiked portion.

11. A belt drive system comprising:
    a pulley comprising:
    a first lateral side;
    a second lateral side, opposite the first lateral side; and
    a peripheral edge extending between the first lateral side and the second lateral side; and
    a groove formed in the peripheral edge, the pulley rotatable in a first rotational direction about an axis;
    an endless belt movable along a circuitous route, the endless belt received into at least a portion of the groove as the endless belt moves along the circuitous route; and
    a belt trap mountable at a location along a belt drive system, the belt trap comprising:
    a first wall;
    a second wall disposed opposite the first wall; and
    an end wall extending between the first wall and the second wall, the first wall, the second wall, and the end wall define a U-shaped structure;
    a channel sized and shaped to receive a portion of the peripheral edge of the pulley; and
    a protrusion extending into the channel from the end wall,
    wherein the belt trap is configured to straddle the pulley such that the first wall is disposed adjacent to the first lateral side of the pulley, the second wall is disposed adjacent to the second lateral side of the pulley, opposite the first lateral side, and the end wall is positioned adjacent the peripheral edge of the pulley.

12. The belt drive system of claim 11,
    wherein the belt trap is positioned at a location along the circuitous route such that the endless belt is received into the channel.

13. The belt drive system of claim 11,
    wherein the first wall and the second wall are nonparallel.

14. The belt drive system of claim 11, wherein the protrusion is configured to engage the endless belt upon release of the endless belt from the pulley.

15. The belt drive system of claim 11, wherein the belt trap further includes a first end and a second end,
    wherein first ends of the first wall, the second wall, and the end wall define the first end of the belt trap,
    wherein second ends of the first wall, the second wall, and the end wall, opposite the first ends respectively thereof, define the second end of the belt trap,
    wherein the protrusion comprises a plurality of protrusion, and
    wherein the plurality of protrusions are arranged along an edge formed at the first end of the first wall or the second end of the first wall.

16. The belt drive system of claim 11, wherein the protrusion defines a peak.

17. The belt drive system of claim 11, wherein the protrusion is transversely oriented relative to the channel.

18. The belt drive system of claim 11, wherein the protrusion is longitudinally oriented relative to the channel.

19. The belt drive system of claim 11, wherein the belt trap further comprises
    a mounting portion formed on one of the first wall or the second wall.

* * * * *